June 6, 1972  A. S. BALCHAN ETAL  3,667,911
METHOD OF TREATING SOLIDS WITH HIGH DYNAMIC PRESSURE
Filed March 4, 1969  3 Sheets-Sheet 2

INVENTORS
Anthony S. Balchan
BY George R. Cowan

June 6, 1972  A. S. BALCHAN ETAL  3,667,911
METHOD OF TREATING SOLIDS WITH HIGH DYNAMIC PRESSURE
Filed March 4, 1969  3 Sheets-Sheet 3

INVENTORS
Anthony S. Balchan
BY  George R. Cowan

United States Patent Office 3,667,911
Patented June 6, 1972

3,667,911
METHOD OF TREATING SOLIDS WITH HIGH DYNAMIC PRESSURE
Anthony S. Balchan and George R. Cowan, Woodbury, N.J., assignors to E. I. du Pont de Nemours and Company, Wilmington, Del.
Filed Mar. 4, 1969, Ser. No. 804,194
Claims priority, application Great Britain, June 28, 1968, 31,117/68
Int. Cl. C01b 31/06, 21/06
U.S. Cl. 23—209.1
7 Claims

ABSTRACT OF THE DISCLOSURE

A process for treating solid materials with controlled, very high, dynamic pressures all or a portion of the total pressure rise occurring in a shock compression and any remaining portion occurring as a smooth, rapid (non-shock) compression, the pressure being released smoothly to ambient conditions, comprising subjecting the lateral boundaries of a body of a solid material to a pressure pulse moving at practically constant velocity in the direction of the body's axial dimension and having practically uniform magnitude and duration over the lateral boundaries, the magnitude and duration being sufficient to sustain a shock wave of substantially uniform intensity spanning a major portion of the body between the lateral boundaries. The process is useful in converting non-diamond carbon to diamond and hexagonal boron nitride to cubic and wurtzitic boron nitride and in compacting solid materials such as silicon carbide powder.

BACKGROUND OF THE INVENTION

This invention relates to a method for subjecting solid materials to dynamic high pressures and diamond thus obtained.

In recent years there has been considerable interest in the development of dynamic high pressure techniques for subjecting solid materials to high transient pressures, pressures above about 50 kilobars whose duration is in the millisecond to microsecond range. Among the objectives of dynamic pressure treatment are the densification of porous materials, modification of the properties and microstructure of materials, and the production of phase changes and chemical reactions.

The application of high transient pressure to a specimen of a practical size involves the motion of a pressure wave through the specimen, consisting of a compression phase and an expansion phase. The compression phase consists of a fast, smooth pressure rise, in which the compression is approximately isentropic, or involves a shock compression, in which the pressure rise is extremely fast and in which irreversible heating occurs, i.e., entropy increases. The expansion phase usually involves not a shock but a rapid, approximately isentropic expansion.

Basically, there are two known methods of subjecting materials to transient high pressures. In one, high pressure is applied (e.g., by detonation of an explosive or projectile impact) over a large area of a specimen simultaneously, or nearly so, to generate a free wave travelling at a velocity determined by the material and the applied pressure. This wave involves shock compression. Even if the pressure is not applied instantaneously, the compression naturally builds rapidly to a shock compression, as would be obtained at once from the impact of a detonation pulse or projectile. Removal of the pressure causes a rarefaction wave to proceed into the material, gradually overtaking the shock and then progressively decreasing the shock pressure. Collision of shock and rarefaction waves with boundaries (containers, etc.) of lower impedance generates reflected waves which travel back into the material, e.g., reflection of a shock wave from a free (unconfined) boundary generates a rarefaction wave. Intersection of rarefaction waves causes a net tension to be generated in the interior of the specimen, which tends to disrupt the material.

Transient high pressures also can be applied progressively to a body, e.g., by detonating a layer of explosive so that the detonation front moves in the direction of the body's larger linear dimension, for example, in the direction of the longitudinal axis of a rod, tube, plate, or strip or radially in the case of a disk. This manner of transient pressure application is employed, for example, in cylindrical and tubular powder compactions, as in U.S. Patent 3,022,544. When the length of the cylinder greatly exceeds its diameter, the pressure wave attains practically steady conditions over much of the cylinder, albeit the conditions at the ends are somewhat different. The steady conditions that have been employed heretofore are those in which oblique shock waves are generated which travel into the powder at a velocity lower than their axial velocity. With sufficient explosive load these waves penetrate to the center where they are reflected from a small central Mach stem travelling in the axial direction. Release of the explosive pressure, as well as reflection of the shock waves from the free boundaries, generates inward moving rarefactions. Intersection of rarefaction waves as well as convergence of the rarefaction waves towards the central axis create tensile stresses which tend to disrupt the sample or cause an undesirable premature loss of pressure. When it is necessary to contain the material to be shocked, as it is in most cases, the nature of the compression and expansion is also adversely influenced by disturbances originating in the containing walls.

The known methods for subjecting materials to high transient pressures thus are beset with two major problems, viz, (a) their inability to establish steady state shock conditions under which the intensity of the shock wave, hence the pressure it generates, is substantially uniform both in the direction the shock wave is travelling and over the plane of the shock front normal thereto (i.e., over the sample's cross section at the shock front), and (b) substantial pressure oscillation behind the shock front caused by intersecting or converging rarefaction waves, i.e., the material behind the shock wave does not have a uniform pressure-time history. As previously noted, these problems preclude substantially uniform application of a given shock pressure and tend to cause sample breakup as well as poor sample recovery. Furthermore, the conditions whch cause (b), supra, also effect rapid pressure attenuation to ambient pressure. This is a distinct disadvantage, e.g., in phase transformations where the temperature attained by the new phase is too high for the phase to remain stable at atmospheric pressure, as is the case when diamond is shock synthesized from non-diamond carbon. Albeit the beneficial effect of a cooling medium adjacent to the new phase is known, this effect cannot be utilized to best advantage if there is a rapid, oscillating pressure drop to ambient conditions, i.e., the pressure should be maintained as long as possible and fall smoothly without oscillations.

SUMMARY OF THE INVENTION

This invention affords a process for obtaining improved results in producing desired changes in solid materials by treating them with very high transient pressures, in which process a major portion of a quantity of condensed material is subjected to a controlled, very high, dynamic pressure, at least part of the total pressure rise occurring in a shock compression and any remaining portion occurring as a smooth, rapid compression; the pressure is released smoothly to ambient conditions; and the material can be contained to permit full recovery after completion of the process.

The process of the invention is applied to solid material in the form of a body having an axial dimension, a minimum dimension which is smaller than the axial dimension and extends in a direction perpendicular to that of the axial dimension, and lateral boundaries which are plane or curved surfaces substantially perpendicular to said minimum dimension (hereinafter referred to as the minimum transverse dimension). The specimen material is contained in a solid container when necessary or convenient. The inventive process comprises applying to the lateral boundaries of the body of solid material, a pressure pulse which, in the steady state, is of practically uniform magnitude and duration over the lateral boundaries and of practically constant velocity in the direction of the body's axial dimension (i.e., in the axial direction); the magnitude of the pressure pulse being at least about equal to the pressure required to sustain in the specimen a shock wave whose shock velocity (i.e., velocity measured in a direction perpendicular to the shock front) equals the axial velocity of the pressure pulse; and the duration of the pressure pulse being sufficient to supply through the motion of the lateral boundaries enough mechanical energy per unit length, measured in the axial direction, to sustain a shock wave spanning the lateral boundaries and having a substantially uniform pressure over a major portion of the body between the lateral boundaries. The shock pressure generated in the solid material, i.e., the pressure immediately behind the shock front, is a function of the velocity of the shock wave passing through it, hence the velocity of the pressure pulse in the axial direction.

The pressure pulse is applied by detonating an explosive adjacent to the body of material or a container therefor, or by impacting the material or its container with a driver. Preferably, the driver is accelerated by means of an explosive. When the process of this invention is used to synthesize one phase of material from another, e.g., diamond from non-diamond carbon according to the general method of U.S. 3,401,019, issued Sept. 10, 1968, a preferred procedure is to maintain the starting material in a metal cylinder and to progressively collapse an explosively driven metal cylinder onto the cylinder containing the carbon.

Another aspect of this invention is a unique form of diamond having a bimodal crystalite size distribution, which is prepared by the process of this invention.

BRIEF DESCRIPTION OF THE DRAWING

The process of the invention will be described with reference to the attached drawings, in which:

FIG. 2A is a schematic drawing of the instantaneous pressure-distance profile along the axis of the specimen described in FIG. 2.

DETAILED DESCRIPTION OF THE INVENTION

Figure 1:
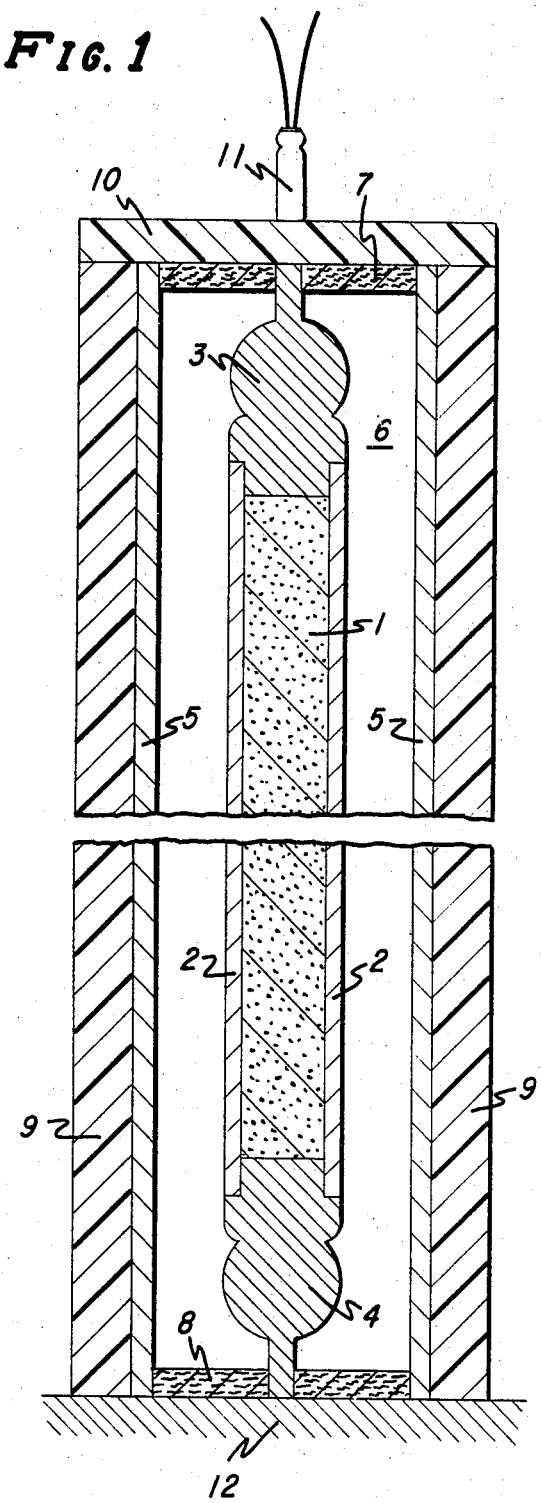
FIG. 1 is a cross-sectional view of an assembly for treating materials according to the process of the present invention.

The pressure pulse required in the present process may be applied by different means in different cases, but the means and conditions must be selected to satisfy certain requirements that are themselves dependent on the nature of the material to be treated and the desired pressure. Some of these means may be restricted in practical applicability to a relatively narrow range of materials and pressures, while others have a broader range of applications. For example, in some cases the material may be a strong non-porous solid that does not require a container. In other cases, e.g., in the production of diamond from non-diamond carbon by the process of the aforementioned U.S. patent, the magnitude of the pressure required may be so high that sample recovery preferably will be by containment in a strong, massive container. Also, containment is desirable when the specimen is relatively porous and is essential when the sample becomes molten during shock treatment. The means of pressure application must be capable of applying the desired high pressure while at the same time providing or permitting adequate containment.

The requirements for the pressure pulse to be applied to the specimen can best be approached by considering the nature of the pressure wave desired in the sample. First of all, it is desirable to subject a large fraction (as much as possible within practical limitations) of the specimen material to the same pressure-time history. For this reason, it is most practical to generate a pressure wave moving with constant velocity in the axial direction so that the pressure is applied across the minimum transverse dimension. Of course, at the locations where the application of the pressure pulse begins and ends, deviation from the steady configuration does occur irrespective of the specimen material's shape. Nevertheless, the process of this invention will provide more uniform pressures with smoother and more uniform pressure release than otherwise obtainable with a specimen of the same configuration. The desired uniformity of pressure treatment can be approached most closely by causing the pressure wave to span the specimen so that the isobaric surfaces are substantially perpendicular to the specimen's axial direction over a major portion of the material's cross section. The leading shock compression would thus ideally be a planar shock which is perpendicular to the axial direction and spans the entire specimen. This ideal uniformity of pressure across the specimen is not completely attainable in practice. However, sufficient uniformity to achieve a desired result throughout most of the specimen can readily be achieved in practice by the method of the present invention, which provides a substantially uniform shock wave spanning a major portion of the material between the specimen's lateral boundaries.

The shape of the body of material to be treated can be as desired. For example, it can take the form of an elongated body such as a bar, strip, or solid or hollow cylinder (e.g., rod, pipe or tube); or a more uniformly extended body such as a plate or disc. In the case of the elongated bodies, the axial dimension is the length of the body and the minimum transverse dimension is the minimum dimension extending in a direction perpendicular to the direction of the axial dimension. Thus, the minimum transverse dimension of a bar or strip is its thickness, of a pipe or tube, its wall thickness, and of a rod its diameter. The lateral boundaries which are subjected to the axially moving pressure pulse are substantially perpendicular to the minimum transverse direction and therefore substantially parallel to the axial direction. In the case of plates or discs the minimum transverse dimension is the thickness and the axial dimension usually is the length or diameter, as the case may be. When treating plates or discs, a suitable shock configuration can be attained even with point initiation of the detonation, after the shock has proceeded outward to a location at which the radius of curvature of the shock in the plane of the plate or disc is large compared to the thickness. In this case the term "axial direction" refers to any direction in the plane of the plate or disc radially outward from the point of initiation (or two points of initiation if there is a plane of symmetry in the center of the disc or slab). Whatever shape specimen is employed, best results will be achieved when it is of uniform composition and density. The specimen preferably will have an initial percent relative density of at least about 40% since more porous specimens are difficult to recover after shocking. Percent relative density is 100 times actual density (i.e., specimen weight divided by its volume) divided by theoretical density (i.e., density if nonporous or 100% dense).

Irrespective of the shape of the specimen, when steady state conditions are reached, a substantially uniform shock wave will span a major portion of the specimen between the lateral boundaries and move through the specimen in the axial direction. When there is point initiation as described above, the portion of the shock wave in question is considered substantially uniform for purposes of this invention when it is substantially perpendicular to the lateral boundaries and has a radius of curvature in the plane of the lateral boundaries and in the axial direction, which is at least about five times its thickness, i.e., its minimum transverse dimension. In all other cases, the shock is substantially uniform when it is substantially planar and perpendicular to the axial direction. Also, the shock wave will have substantial uniformity over a major portion (more than 50%) of the specimen material between the lateral boundaries, i.e., of the cross section of the specimen in a plane perpendicular to the axial direction. After steady state conditions are reached, the degree of deviation of the shock configuration from the ideal, hence the variation in shock pressure along the shock front, that may be tolerated in an particular instance will depend on the range of shock conditions that will produce the desired change in the material being treated.

Generally, in the steady state, more than 50% of the specimen's cross-sectional area (i.e., in any plane perpendicular to the axial direction) will be subjected to a shock pressure equal to at least 50%, and preferably at least about 75%, of the maximum possible shock pressure $P_1$, as hereinafter defined. The shock configuration actually obtained with any given conditions can be measured with a streak camera. Pressure variation over the cross section at the shock front is easily determined from the known shock configuration and the known Hugoniot for the specimen.

Before steady state conditions are reached in a cylindrical specimen, the pressure pulse usually will have to travel in the axial direction a distance equal to about five times the difference between the cylinder's outer diameter and its inner diameter (if any). Where the specimen is flat, i.e., a strip, plate or disc, etc., steady state conditions will be reached after the pressure pulse has traveled a distance in the axial direction equal to about five times the specimen's thickness. The foregoing means that either the dimension of the specimen in the axial direction should substantially exceed the above startup distances or a solid material of about the same density and shock impedance as the specimen material should be used in its place over the startup distance. Which procedure is used will depend on the cost of the specimen material versus that of a suitable replacement. Release effects, i.e., where the shock wave leaves the specimen, are not as significant. Normally the steady state configuration will prevail unitl the shock wave leaves the specimen but the decay of pressure behind the shock will be modified by end effects over a length of the specimen equal to about twice the specimen's minimum dimension. Such release effects can be substantially eliminated by abutting the end or edge where the shock wave exits the specimen with an equivalent amount of solid material of about equal shock impedance and density.

The shock pressure is applied to the lateral boundaries of the specimen, i.e., to practically all of its lateral boundaries, and after the pressure pulse reaches steady state conditions, it moves at a practically constant velocity in the axial direction and is of practically uniform magnitude and duration over the lateral boundaries. To illustrate, where a cylindrical specimen is being shocked by a surrounding cylindrical layer of explosive or an explosively driven cylindrical driver the pressure pulse will be in the form of a ring surrounding the specimen and moving at constant velocity in the direction of the specimen's longitudinal axis. The ring-shaped pressure pulse will lie in a plane that is practically perpendicular to such axis and will be of practically the same magnitude and duration at all points on the ring and will retain this magnitude and duration as it moves in the axial direction. This requires that the explosive be initiated with practically circular symmetry about the axis. In the case of a flat specimen, where two active sources of energy are employed, e.g., two driver plates, one at each lateral boundary, the configuration of the pressure pulse on one lateral boundary should at all times be the mirror image of the pressure pulse on the other lateral boundary and have practically the same magnitude and duration. Since, in such cases, both pressure pulses are practically the same and cannot be considered independently of each other, they will be referred to together as "a [or the] pressure pulse" unless otherwise specifically indicated. Where an explosive is point initiated in the treatment of a flat specimen, the applied pressure pulse is uniform over the intersections of the lateral boundaries and transverse circular cylinders concentric with the point(s) of initiation.

While any desired configuration can be used, it is readily apparent that certain configurations which have elements of regularity and symmetry are preferred for reasons of ease of attainment of uniform pressure, sample containment, and ease of assembly. For example, a solid right-circular cylinder is advantageous in achieving extremely high pressures and good sample recovery, particularly where the sample is largely melted by the dynamic pressure treatment. A thin flat slab with parallel faces is a shape that may be conveniently prepared and for which pressure uniformity may be easily attained; however, there may be edge effects at the lateral edges of the plate that may cause some loss of specimen or nonuniform treatment at these edges. For this reason, specimen material or material of about the same impedance and density, having a width equal to at least five times the specimen's thickness should be provided at each lateral edge of the specimen and confined by a massive high-impedance material such as steel. In the flat slab, greater pressure uniformity can be obtained by using two active pressure sources, one on each opposed face, to achieve symmetry. However, it may be more convenient to support the slab on a massive high-impedance backer, using an active pressure source, such as an explosively driven plate, on the top face only, and still achieve adequate uniformity. Another configuration which may present significant advantages in some cases is an annular cylinder, surrounding a supporting high-impedance mandrel. The impedance (i.e., shock impedance) of a material equals its initial density times the velocity of the shock wave passed through it.

Before describing the requirements for applying the pressure pulse to the material, it is helpful to consider the flow behind the shock front, using a coordinate system which is moving in the axial direction with the imposed constant axial velocity. In this coordinate system the steady flow in the region downstream from the shock front is of interest. It is well-known that the flow velocity immediately behind a stationary head-on shock is subsonic. If the shock front is tilted so that it is oblique to the steady upstream flow velocity, the shock pressure is decreased and the velocity immediately behind the shock front is closer to the sonic value. For a sufficiently oblique shock this velocity becomes supersonic. In this event reflected shock and rarefaction waves occur in the flow causing the deleterious effects already noted above.

With a nearly plane head-on shock the pressure downstream from the shock front will vary with distance along the axis in approximately the same way that the pressure applied to the lateral boundaries varies in the axial direction, provided that the applied pressure is substantially uniform around any perimeter of the material that is perpendicular to the axis, and also provided that the pressure applied to the boundaries varies smoothly in the axial direction. The nature of the flow downstream from such a shock front can be approximated as a steady "one-dimensional" channel flow, with varying cross-section, as is used in the approximate description of the flow in a rocket nozzle in aerodynamics. If there is a rise in pressure immediately behind the shock front, as will be the case when the shock front is driven ahead of the applied pressure, the pressure increase is accompanied by a decrease in flow velocity that is relatively greater than the accompanying increase in density so that the cross-sectional area of the channel increases with increasing pressure. If the channel expands to a very large area, the flow comes approximately to rest, with the pressure approaching a limiting value, the "stagnation pressure" which is fixed for a given strength shock front in a given material. On the other hand, a drop in pressure in the subsonic flow behind the shock front is accompanied by a decrease in cross-section and a corresponding increase in flow velocity. Eventually the velocity passes through the sonic value and the flow becomes supersonic. For steady supersonic flow a drop in pressure causes an increase in velocity which is relatively smaller than the accompanying decrease in density; therefore the cross-sectional area for a fixed total mass flow must increase with a decrease in pressure. Thus the channel area passes through a minimum value, corresponding to the well-known nozzle throat area, as the flow downstream from the shock front passes from subsonic to supersonic.

In the present process, the smooth changes in flow conditions downstream from the shock terminate when the pressure approaches ambient conditions, e.g., atmospheric pressure or some higher pressure maintained by some means of confinement. Whether the downstream flow is supersonic or subsonic when the pressure reaches ambient conditions depends on the nature of the material. For initially dense solids that do not undergo a phase change, the flow will generally become supersonic before the pressure falls to ambient conditions, and the cross-sectional area usually will slightly exceed the initial cross-sectional area ahead of the shock front. In most cases the material will have some initial porosity, or will contain substances which undergo a permanent phase change to a phase of higher density. The permanent volume change associated with the loss of porosity or the phase change usually will be sufficient to cause the flow downstream of the shock front to remain subsonic at the point where the pressure has reached ambient conditions.

The above discussion of the desired flow configuration as a one-dimensional channel flow permits a definition of what is required of the means for applying the pressure pulse to the lateral boundaries of the material so that the advantages of the process of this invention are obtained. The above one-dimensional treatment neglects transverse pressure gradients, which would imply that the changes in cross-sectional area take place in an infinite amount of time. However, to cause those area changes in practical times requires appreciable transverse pressure gradients. This places two requirements on the means for applying the pressure pulse to the lateral boundaries of the specimen material if a practically ideal shock configuration is to be obtained. These requirements are: (1) the means should be capable of generating a pressure pulse which at least equals and preferably exceeds the pressure immediately behind the transverse shock, i.e., a pressure pulse of equal or greater magnitude than the pressure required to sustain a shock wave whose shock velocity is the same as the axial velocity of the pressure pulse; and (2) the means should maintain the required pressure pulse as the cross-sectional area contracts to its minimum value, either the area at the sonic point or the area at the final pressure if the flow is still subsonic, i.e., the duration of the pressure pulse should be sufficient to supply through motion of the lateral boundaries enough mechanical energy per unit length, measured in the axial direction, to sustain a planar shock that spans the lateral boundaries.

Unless the applied pressure meets requirement (1), it is impossible to meet requirement (2). If both requirements are met, the planar (head-on) shock will be sustained, and if the applied pressure exceeds these requirements, such a shock will be driven slightly ahead of the applied pressure pulse.

Although requirement (2), as applied to the pressure generating means, is difficult to predetermine accurately by available techniques, we have found that one will obtain a substantially uniform shock wave spanning most of the specimen material between the lateral boundaries, if the pressure generating means meets requirements (1) and (2) in the manner hereinafter described. Optimum conditions can then be determined easily with a minimum amount of experimentation. Requirement (2) is considered first since its magnitude at the lateral boundaries is the same irrespective of the means used to apply the pressure, the configuration of the specimen and its containment (if any). Consideration will then be given to requirement (1) as applied to various specimen configurations and to suitable means for applying the required pressure pulse to the specimen.

The energy required to meet requirement (2) in the ideal case is determined by considering the way in which the energy is dissipated in the material being treated. The only significant source of energy dissipation is the irreversible heating in the shock front. This is calculated from the Hugoniot curve and the equation of state of the material being treated. The expansion of the material behind the shock is considered isentropic, although there are usually some irreversible processes occurring in the expansion, such as the process associated with the platic deformation of a solid material. However, the energy losses caused by these irreversible processes are negligible on the scale of pressures of interest. Designating the initial state of the specimen by subscript 0, the state immediately behind the shock by subscript 1, and the state attained by by isentropic expansion from State 1 to a final pressure $P_2$ and volume $V_2$ by subscript 2, the changes in internal energy E in the shock front and in the isentropic exponsion are:

$$E_1 - E_0 = \tfrac{1}{2}(P_1 + P_0)(V_0 - V_1) \text{ (Hugoniot)} \quad \text{(Eq. 1)}$$

$$E_1 - E_2 = \int_2^1 P dV \text{ (isentropic)} \quad \text{(Eq. 2)}$$

In terms of the laboratory coordinate system, the change in energy per unit mass from State 0, in which the velocity of the specimen material is zero, to State 2, in which the velocity is $U_f$, is $$E = E_2 - E_0 + \tfrac{1}{2} U_f^2 \quad \text{(Eq. 3)}$$

E (Eq. 3) is the energy per unit mass of specimen, which must be applied to the lateral boundaries of the specimen to meet requirement (2) if a practically ideal shock confiugration is to be obtained.

The term $E_2 - E_0$ (Eq. 3) is given by Eqs. 1 and 2 applied to the Hugoniot shock compression curve and the appropriate curve for isentropic expansion. The kinetic energy term $\tfrac{1}{2} U_f^2$ also is obtained from the changes in velocity associated with the shock and the steady isentropic expansion. In the steady-state coordinate system moving along with the shock velocity $U_s$ relative to the laboratory coordinates:

$$U_0 = U_s \quad \text{(Eq. 4)}$$

$$U_1 = U_s - U_p \quad \text{(Eq. 5)}$$

$$U_2 = U_s - U_f \quad \text{(Eq. 6)}$$

where $U_p$ is the change in material velocity produced by the shock. From the shock front equations it can be shown that $$U_s^2 = \frac{P_1 - P_0}{V_0 - V_1} V_0 \quad \text{(Eq. 7)}$$

and $$U_1^2 = \frac{P_1 - P_0}{V_0 - V_1} V_1^2 \quad \text{(Eq. 8)}$$

$U_2$ is obtained from the following equation for steady one-dimensional channel flow, $$U_2^2 - U_1^2 = 2\int_2^1 V dP \text{ (isentrope)} \quad \text{(Eq. 9)}$$

Hugoniot curves and isentropic expansion curves for many materials are given in the literature. Techniques for determining Hugoniot curves and methods for deriving isentropic expansion curves from the Hugoniot curves are well known. In many cases the initial material will be porous. It can be seen from Eq. 1 that the additional compressional work done by the shock causes a considerable increase in the energy dissipated in shocking the material to a given pressure, and the additional energy content will cause an increase in volume $V_1$ over that obtained in shocking nonporous material to the same pressure. In many cases the Hugoniot curve is available only for non-porous material. The Hugoniot for the desired porous condition can be measured or calculated by well-known techniques similar to those used to determine isentropes. In other cases one is dealing with a mixture of two materials with known Hugoniot curves. The Hugoniot curve for the mixture can be estimated with generally sufficient accuracy by adding the weighted volumes of the individual Hugoniot curves, as an alternative to measuring the Hugoniot for the mixture.

The energy requirement E is obtained from Eq. 3 by making State 2 (Eqs. 2 and 9) coincide with the minimum cross-sectional area behind the shock front. As already noted, the minimum in some cases will occur at the point where the flow velocity ($U_2$, obtained from Eq. 9) equals the velocity of sound C of State 2, given by the well-known expression $$C^2 = -V^2 \left(\frac{dP}{dV}\right) \text{ isentropic} \quad \text{(Eq. 10)}$$

This area is termed the critical area or the minimum throat area. Further decrease in pressure is associated with an increase in area since the flow is then supersonic. The expansion of the material between the sonic point and the point at which the final ambient pressure is attained will do work on the pressure-generating means. Therefore the energy requirement is that required by Eq. 3 with State 2 being that corresponding to the critical sonic flow.

The other situation is that in which ambient pressure is reached at a point behind the shock front where the flow is still subsonic. In this case the minimum area is reached at ambient pressure. The pressure-generating means must therefore be capable of supplying at least the amount of energy required by Eq. 3 with the State 2 corresponding to ambient pressure. This is the type of behavior usually experienced in practice. It occurs when there is a net decrease in specificc volume of the material, e.g., due to the closing up of an initial porosity, or a permanent change to a phase of higher density, in spite of the increased energy content due to shocking. Normally, both the initial and final pressures will be atmospheric pressure, which on the scale of pressures of interest can be taken as zero. If the process is performed in a pressure bomb, final pressure will, of course, be significantly higher than atmospheric pressure.

The changes in cross-sectional area of the channel behind the shock front, hence the minimum cross-sectional area, can be obtained from the equation for the conservation of mass in the steady flow $$\frac{Aq}{V} = \text{constant} = \frac{A_0 U_0}{V^0} \quad \text{(Eq. 11)}$$

where A is the cross-sectional area and $q$ is the flow velocity of the specimen relative to the shock front and is obtained from $$q^2 - U_1^2 = \int^1 V dP \text{ (isentrope)} \quad \text{(Eq. 11A)}$$

It has been noted above that the pressure will rise behind the shock, with a corresponding increase in cross-sectional area, when the shock front is driven ahead of the pressure pulse. Since this rise is practically an isentropic compression, there is no significant first-order net energy loss. The extent of the pressure rise cannot be simply related to an energy requirement on the pressure-generating means. However, the maximum possible pressure for a given case can easily be obtained, since it corresponds to an infinite cross-sectional area and a zero flow velocity. From Eq. 11A, with $q=0$ $$U_1^2 = 2\int_{P_1}^{P_s} V dP \text{ (isentropic)} \quad \text{(Eq. 12)}$$

where the limit $P_s$ is the maximum or "stagnation" pressure for the given steady flow. The amount by which the stagnation pressure obtained from Eq. 12 will exceed the shock pressure increases with increasing relative density of the specimen, where relative density equals actual density divided of the specimen, where relative density equals actual density divided by theoretical density (i.e., if 100% dense). One practical significance of a pressure rise behind the shock front is that it increases the time during which the specimen is subjected to high pressures. It may also favor a phase change since shocking to $P_1$ followed by non-shock compression to higher pressure $P_3$ will give a lower specimen temperature than shocking directly to $P_3$.

If requirement (2) is determined in the foregoing manner from Eq. 3, the energy value (E) obtained will be the energy which should be applied to the lateral boundaries of the specimen if a practically ideal shock configuration is to be obtained. In the ensuing discussion, it will be shown how to meet requirement (1) and how to translate E at the specimen's boundaries into quantitative requirements for various pressure generating means, so that a substantially uniform shock wave will span a major portion of the specimen between its lateral boundaries. Shock waves of such extent and configuration will sometimes be referred to herein as substantially uniform transverse shock waves.

Pressure application by explosive in contact with
with a self-supporting specimen The nature of the pressure pulse applied to the boundaries of the specimen depends on the properties of the medium by which the pressure is applied in relation to the properties of the specimen material. The simple case of an explosive in direct contact with the specimen is considered first, attention being focused on the boundary between the explosive and the specimen. In this case, (1) the detonation pressure of the explosive should at least about equal and preferably will exceed the pressure immediately behind the transverse shock; and (2) the energy supplied to the lateral boundaries by detonation of the explosive should be sufficiently close to E (Eq. 3) to sustain a substantially uniform transverse shock. As to (1), the desired pressure $P_1$ immediately behind a head-on transverse shock moving at velocity D in a specimen whose initial density is $\rho_0$, is $$P_1 = \rho_0 DU = \rho_0 D^2 \frac{\Delta V}{V_0} \quad \text{(Eq. 13)}$$

$\Delta v/v_0$ being obtained from the Hugoniot for the specimen. To meet requirement (1), detonation pressure $P_x$ should be at least about $P_1$. $P_x$ for many explosives is known and where unknown can be determined by known techniques, e.g., by the method of Deal, Journal of Chemical Physics, vol. 27, 1957, p. 796. $P_x$ can also be determined from the equation $$P_x = \rho_x DU_{P_x} \quad \text{(Eq. 14)}$$

where $\rho_x$ is the initial density of the explosive, and $Up_x$ is the change in particle velocity of the explosive, which is obtained from the explosive's Hugoniot. For most explosives, $Up_x$ is equal to about $D/4$, making $$P_x = \rho_x D^2/4 \qquad \text{(Eq. 14A)}$$

This equation provides a convenient estimate of the feasibility of employing the contact method of shocking. The requirement that $P_x$ be at least equal to about $P_1$ thus requires that $$\frac{\rho_x}{4\rho_0} \geqslant \text{about } \frac{\Delta V}{V_0} \qquad \text{(Eq. 15)}$$

Since the densities of commonly available explosives are usually less than the initial density of the material being shocked, the inequality (15) is usually satisfied only when the relative shock compression, $\Delta V/V_0$, is small. The utility of the contact explosive configuration thus will generally be for shocking materials of near theoretical density to moderate pressures (e.g., up to about 200 kilobars) for change of properties or change of phase. A number of instances of the shocking of circular cylindrical specimens (usually contained in a tube) have been reported heretofore where the purpose has been to compact an initially porous powder or to comminute or modify the properties of an initially porous material. In all of these instances the relative compression of the specimen material was much too great to allow formation of a substantially uniform transverse shock.

Returning to requirement (2), the amount of explosive must supply an amount of energy sufficiently close to E to produce at least a substantially uniform transverse shock. To translate E into a loading of explosive per unit area of lateral boundary requires solution of the flow configuration for the explosive detonation products and the specimen taken together. The amount of explosive required to sustain an ideal transverse shock is estimated as follows. The relation between pressure P and boundary deflection angle $\theta$, behind a detonation moving along the boundary, in the absence of effects arising from the opposite boundary of the explosive, is termed the detonation polar. It is obtained from the equation of state of the detonation products by applying the equation for the well-known Prandtl-Meyer expansion for supersonic flow, starting from the sonic flow of the Chapman-Jouguet state immediately behind the detonation front. In the high pressure range of interest, the equation of state of the detonation products can be described by a polytropic law, and the polytropic exponent $\gamma$ is obtained from the detonation pressure $P_x$ and the known detonation velocity $D$.

$$P_x = \rho_x D^2/(\gamma+1) = \rho_x D U_{px} \qquad \text{(Eq. 16)}$$

$P_x$ is obtained either by measurement or computation. $\gamma$ is known for several high explosives, and generally varies from about 2.8 to 3 for straight high explosives, but ranges from about 3 to 4 for explosives containing relatively incompressible, inert solids in amounts up to about 70% by weight. Equations describing the Prandtl-Meyer expansion for a polytropic material are $$\frac{P}{P_x} = \left[\frac{1 - \{(\gamma-1)(\gamma+1)\}M_x^2}{1(\gamma-1)(\gamma+1)}\right]^{\gamma/(\gamma-1)} \qquad \text{(Eq. 17)}$$

$$2\theta = \cos^{-1}\left[\gamma - \frac{\gamma+1}{M_x^2}\right] + \left(\frac{\gamma+1}{\gamma-1}\right)^{1/2} \cos^{-1}[\gamma(-1)M_x^2] - \pi$$

$$\text{(Eq. 18)}$$

$M_x$ appears only as a parameter. It is the flow velocity divided by the critical velocity, and has the value 1 in the Chapman-Jouguet state immediately behind the detonation, and increases downstream. As $\theta$ increases, P falls monotonically from a maximum value of $P_x$ at $\theta=0$ and for most explosives $P=P_x/2$ at $\theta$ approximately $5°$.

Treating the flow behind the ideal transverse shock as a one-dimensional channel flow in the plane symmetric case, we have the following relation between the boundary deflection angle and the variation of P with distance $s$ downstream from the shock front, $$\frac{ds}{dP} = \frac{y_0}{\tan \theta} \frac{d(A/A_0)}{dP} \qquad \text{(Eq. 19)}$$

where $y_0$ is the initial value of the half width of the specimen. The relation between cross-sectional area A and P is obtained from Eqs. 11 and 11A. The maximum rate of contraction of the specimen cross-section, even with a very large amount of explosive, must be such that $\theta$ equals the value on the detonation polar (obtained by Eq. 18) at the value of P in the specimen corresponding to $A/A_0$. Thus $\theta$ versus $s$ can be obtained by (numerical) integration of Eq. 19.

$$\Delta s = y_0 \int_{P_1}^{0} \frac{1}{\tan \theta} d(A/A_0) \qquad \text{(Eq. 19A)}$$

The amount of explosive required to provide the duration $$\Delta t = \Delta s / D \qquad \text{(Eq. 20)}$$

is estimated as follows: We have found that the acceleration of a flat plate by detonation of a layer of explosive is described quite well by a combination of the well-known Gurney formula for maximum plate velocity, $V_{p_m}$, and an assumed exponential decrease of explosive pressure with time at a fixed location on the plate. Thus $$V_{p_m} = (2E_G)^{1/2} \left\{ \frac{(1+2m_d/m_x)^3 + 1}{6(1+m_d/m_x)} + m_d/m_x \right\}^{-1/2}$$

$$\text{(Eq. 21)}$$

where $m_d/m_x$ is the ratio of the mass of the plate to the mass of the explosive, where $E_G$ is the Gurney energy, and can be taken as 0.6 Q, where Q is the heat of detonation. $E_G$ can also be determined experimentally by measuring $V_{p_m}$. The time dependence of the pressure decay is $$P = P_x e^{-t/\tau} \qquad \text{(Eq. 22)}$$

where $\tau$ is the time constant. The velocity of the plate $V_p$ as a function of distance of travel Y in a direction perpendicular to the plate obtained from this pressure-time relation is $$\frac{Y P_x}{V m_d V_{p_m}^2} = -\ln\left(1 - \frac{V_p}{V_{p_m}}\right) - \frac{V_p}{V_{p_m}}$$

$$\text{(Eq. 23)}$$

and $$\tau = \frac{m_d V_{p_m}}{P_x} \qquad \text{(Eq. 24)}$$

The maximum value of $\tau$, $\tau_m$, occurs for $m_d/m_x = \infty$, and is given by $$\frac{\tau_m}{m_x} = \frac{0.866(2E_G)^{1/2}}{P_x} \qquad \text{(Eq. 25)}$$

$\tau_m/m_x$ is a characteristic of the explosive.

The amount of explosive required to sustain a head-on shock configuration is estimated by setting $\tau_m = \Delta t$, so that $$m_x = \frac{P_x y_0}{0.866(2E_G)^{1/2} D} \int_{P_1}^{0} \frac{d(A/A_0)}{\tan \theta} \qquad \text{(Eq. 26)}$$

The ratio of the thickness of the explosive layer $W_x$ to the half thickness of the slab specimen is $$\frac{W_x}{y_0} = \frac{m_x}{\rho_p W_s} = \frac{P_x}{0.866(2E_G)^{1/2}\rho_x D} \int_{P_1}^{0} \frac{d(A/A_0)}{\tan \theta}$$

$$= \frac{D}{0.866(\gamma+1)(2E_G)^{1/2}} \int_{P_1}^{0} \frac{d(A/A_0)}{\tan \theta} \qquad \text{(Eq. 27)}$$

The value of the integral in Eq. 27, i.e., $\Delta s/y_0$ (Eq. 19A) which may be termed a shape factor, has in a typical case a value of about 5. Larger values may be required when $P_x$ only slightly exceeds $P_1$ and when the sample material compresses considerably, e.g., due to a high initial porosity. If $P_x$ is considerably larger than $P_1$, the shape factor may be less than 5. However, too low a value of the shape factor should not be used because a too abrupt change in cross-section would detail transverse pressure gradients and distortion of the flow configuration in the sample.

The factor $D/0.866 \, (\gamma_r+1)(2 \, E_G)^{1/2}$ in Eq. 27 has values of about 0.6 to 0.8 for typical cases. Thus as an approximate guide $W_x/y_0$ may be taken as about 3. When a cylindrical sample is being shocked by a cylindrical layer of explosive, the problem of estimating the required explosive load is complicated by convergent flow in the sample and divergent flow of the detonation products. We have found it suitable to use the same mass ratio of explosive to sample as is required for a plane symmetrical slab.

Explosive in contact with a container for the specimen

In many cases it will be necessary or convenient to contain the material to be shocked in some sort of container interposed between the explosive and the material. Regarding the pressure applied to the lateral boundaries of the specimen, requirements (1) and (2) remain as before, but when determining the nature of the explosive required, the pressure and energy dissipated in the container walls as well as the possibility of oblique shock waves in the walls must be taken into account. If the container is required only to hold the sample previous to shooting and is not needed for sample recovery, the container wall can be thin relative to the sample, e.g., up to about 0.2 times the specimen's minimum transverse dimension. In that case even if oblique shock waves and rarefaction waves occur in the container wall, they will have negligible effect on the pressure-time history of the sample. The reverberating waves in the container will tend to damp out, and the container will tend to equate the pressure of the explosive with the pressure on the sample directly through the wall. On the other hand, it may be necessary to make the container relatively thick to contain the material after shocking. In that case, oblique shock waves in the container should be avoided because they will cause large pressure oscillations in the specimen. Oblique shocks can be avoided in two ways. First, if the detonation velocity of the explosive is subsonic with respect to the sonic velocity of the container there will not be any shock waves in the container wall. As used herein, the sonic velocity of a material is the velocity at which a weak plastic shock wave moves through it. If D is supersonic with respect to the container, oblique shocks can be avoided by making the pressure pulse applied to the container's lateral boundaries meet requirements (1) and (2), supra, so that a substantially uniform shock will span the container walls. These requirements are determined in the same way as for the specimen material, and the values thus obtained are added to those required to sustain a substantially uniform shock in the specimen.

Furthermore, when thick-walled containers are employed, the amount of explosive should be increased to account for dissipation of the pressure pulse during plastic deformation of the container wall. This is done by increasing the mass per unit area of explosive (computed for the specimen alone) in proportion to the increase in total mass per unit area (specimen plus container) provided by the container.

The case of a circularly cylindrical container requires further attention because of the effect of convergence. The convergence makes it possible to obtain a pressure pulse of greater magnitude and duration at the specimen boundary than is exerted by the explosive.

Regarding the effect of convergence on the magnitude of the pressure pulse, i.e., requirement (1), $$P_x \geq \text{about} \left(\frac{r_i}{r_o}\right)^{1/2} P_1 \quad \text{(Eq. 28)}$$

where $P_x$ and $P_1$ are as before, $r_i$ is the internal radius of the container and $r_o$ is its external radius. It is seen therefore that the convergence effect reduces the magnitude of the pressure $P_x$ that must be generated by the explosive to apply a pressure pulse of magnitude $P_1$ to the lateral boundaries of the specimen.

It is not necessary that the explosive be applied to all lateral boundaries of the sample or sample container. A massive high-impedance backer, e.g., of steel, may be used to confine some of the lateral boundaries. The backer must be capable of supporting dynamically the high pressure transient generated in the sample without requiring the expenditure of a large amount of energy. If such a backer is used, the explosive load must be increased to supply the energy lost from the specimen material to the backer. In spite of the increased energy requirement, the use of a backer may be advantageous because such an arrangement is easy to assemble. For example, a massive steel slab could be used to support a flat slab sample, with an explosive layer placed on top of the sample. In a cylindrical arrangement, a solid central circular rod could be used inside an annular sample with an external annulus of explosive.

Whether a backer is used or explosive is applied to all lateral boundaries of the sample or its container, pressure requirement (1) remains the same. In other words, $P_x$, the required pressure per unit area of the sample or container's lateral boundaries, does not change. For example, with a flat slab specimen, the explosive determined to have the required $P_x$ will generate the apropriate $P_1$ (Eq. 13) whether the explosive is applied to both lateral boundaries of the slab or only to one lateral boundary with the other lateral boundary supported by a massive high-impedance backer. In the latter case, the pressure pulse is applied to one boundary by a passive source, i.e., the backer. The total energy, requirement (2), that is to be applied to the lateral boundaries of the specimen or container likewise remains the same when a backer is employed. Here, however, since the backer is passive, hence not an active source of energy, twice as much explosive must be used on one lateral boundary of the slab as would be used if the explosive were placed on both of the slab's lateral boundaries. Thus, if the total energy requirement is such that 16 pounds of explosive must be used, 8 pounds can be uniformly distributed over each of the two lateral boundaries. If a backer is used, the amount of explosive applied to one lateral boundary will be 16 pounds plus an amount sufficient to equal the energy dissipated in the backer, as hereinafter described (Eq. 35).

As a rule any backer should have a shock impedance of at least about $3 \times 10^6$ dyne-sec./cm.$^3$ at zero pressure. A flat backer, e.g., for a slab, should have a mass per unit area at least about 5 times that of the sample. Where a rod-shaped backer is used in the center of an annular specimen, the diameter of the rod will be the internal diameter of the specimen or its container, but is not otherwise significant. It is desirable to avoid oblique shock waves in the backer or to have them detached from the shock in the sample. If the backer's sonic velocity is greater than the velocity of the pressure pulse in the axial direction, there will be no shocks in the backer. When the pressure pulse is supersonic with respect to the backer attached shocks are avoided by having the pressure $P_1$ in the sample exceed the pressure $P_b$ of the shock wave in the backer whose shock velocity is equal to the axial velocity D. $P_b$ is determined by applying Eq. 13 to the backer material.

Pressure application by projectile or driver

Alternative to pressure application to the specimen material or its container by detonating an explosive in contact therewith, the pressure can be applied by the progressive impact of a driver plate or cylinder. Although in some configurations it may be possible to accelerate the driver by other energy sources, it will usually be most convenient to accelerate the driver by means of a detonation.

The steady configuration moving axially can be obtained most simply by arranging the driver parallel to the lateral boundaries of the specimen or its container at a standoff therefrom, covering the driver with an explosive layer of uniform detonation velocity in the axial direction, and initiating the explosive so that detonation travels in the axial direction. After the initial transient (startup) phase, the impact of the driver on the specimen (or container) will progress with constant velocity in the axial direction. If the impact of the driver on the specimen is capable of (1) developing the required magnitude of pressure and (2) is capable of supplying to the specimen the energy required to support the substantially uniform transverse shock as outlined above, the desired flow configuration will be obtained. If the driver is a dense high-impedance material, such as a steel plate or tube, the impact can generate considerably higher pressure at its interface with the sample or its container than can the explosive itself. For this reason the driver technique has a much wider range of applicability both as to range of properties of the specimen material and to the range of pressures which can be applied. The method is especially useful in applying high pressures to materials that possess an appreciable initial porosity, e.g., materials whose percent relative density is less than about 95%, or to materials that undergo a decrease in volume due to a phase change.

For contained samples, it will generally be convenient to use a high-impedance metal container, such as a steel or stainless steel tube, and also to use a driver plate or tube of about the same impedance. This will tend to reduce pressure variations across the sample. Also, since the pressure on the sample boundaries is due to the deceleration of the driver and container, the development of a smooth pressure decay in the sample will require the absence of pressure oscillation in the driver and container.

It has been found that pressure oscillations are not substantial so long as the conditions under which the driver and container collide cause jetting at the collision region, preferably accompanied by metallurgical bonding. Jetting is the phenomenon where metal from the opposed surfaces of progressively colliding metals is propelled forward away from the collision region. Both jetting and bonding conditions are known and are described, e.g., in U.S. 3,233,312, 3,264,731, and Cowan and Holtzman, Flow Configurations in Colliding Plates—Explosive Bonding, Journal of Applied Physics, vol. 34, No. 4, 1963, pp. 928–939. Shock waves in the driver and container can be avoided entirely in the steady-state configuration by keeping the axial velocity, i.e., the velocity of the collision line along the driver and container, at a value less than the sonic velocity of the driver and container. In this case, jetting will be accompanied by metallurgical bonding of the driver to the container. The flow velocity of the driver and container in the steady-state coordinate system remains subsonic throughout the flow, thus ensuring an absence of pressure oscillation in the walls. For this reasin, this is a preferred embodiment. Where the driver collides directly with the specimen substantial pressure oscillation in the driver is again avoided by causing jetting at the collision line, and shock waves in the driver are avoided entirely by keeping the collision velocity subsonic with respect to the driver. Collision velocity must, of course, be supersonic with respect to the specimen so that a shock wave will be generated therein.

An assembly for applying transient pressure to a specimen by the process of the invention using an explosively driven projectile is shown in FIG. 1. In FIG. 1, specimen 1, e.g., of packed powder, is in cylindrical metal container 2, the ends of which are closed by metal plugs 3 and 4. Metal cylinder 2 fits coaxially inside metal cylinder 5, with a uniform spacing 6 between the facing surfaces of cylinders 2 and 5. The coaxial spacing is maintained by disks 7 and 8, having central apertures into which the ends of plugs 3 and 4 fit, respectively. A cylindrical layer of detonating sheet explosive 9 surrounds cylinder 5. Explosive 9 is initiated by means of an explosive disk 10, initiated at its center by electric blasting cap 11. The entire assembly rests on metal anvil 12. Electric blasting cap 11 is actuated by passage of electric current through its lead wires, and explosive disc 10 is thereby initiated at its center. The detonation front therefore reaches the entire periphery of cylindrical explosive layer 9 simultaneously, initiating said layer at said periphery simultaneously and causing a detonation to proceed through said layer in an axial direction, and thereby causing cylinder 5 to converge rapidly in a progressive manner and to collide progressively with the lateral boundaries, i.e., the outside surface, of cylinder 2.

Alternatively, in FIG. 1, powder 1 can be in the form of a slab maintained between two flat metal plates 2, 2 impacted symmetrically by initially flat driver plates 5, 5 driven by identical explosive layers 9, 9, initiated simultaneously at corresponding locations by initiation means 10–11. The cylindrical and flat plate situations would differ only because of convergence effects in the cylindrical case.

Figure 2:
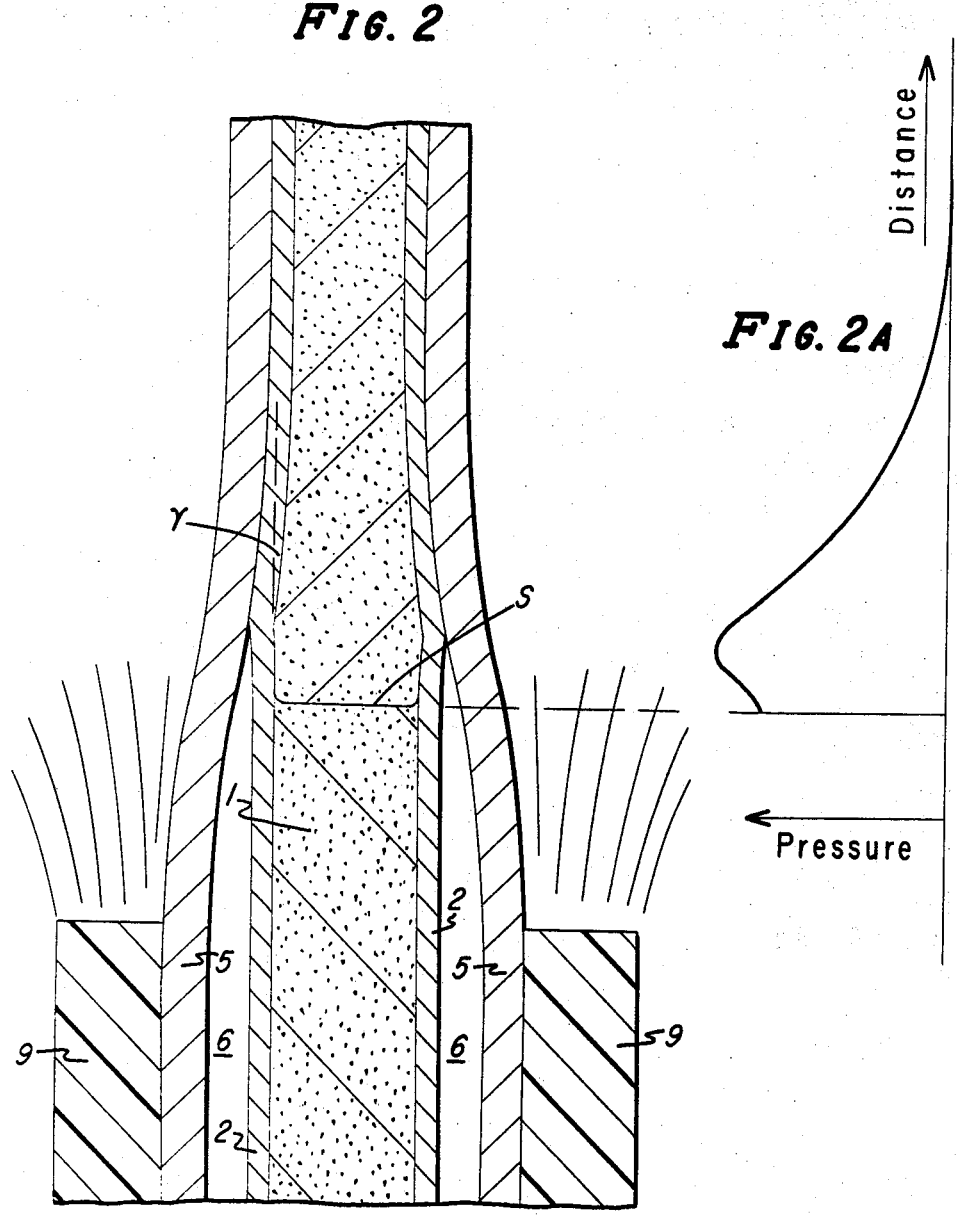
FIG. 2 is a schematic representation of the events preferably occurring during operation of the assembly shown in FIG. 1.

The way in which the flow configuration varies with energy supply (E) can be understood by reference to FIG. 2, which shows the ideal head-on transverse shock condition with a contained sample impacted as shown in FIG. 1 by a driver plate or tube driven by a detonation in the preferred case where the steady axial propagation velocity, determined by the detonation velocity, is less than the sonic velocity of the driver and container. If the stand-off gap 6 between driver and container is sufficiently large in relation to the explosive load, a distance equal to the thickness of the driver being usually adequate, the explosive will not transfer an appreciable amount of energy to the driver after impact with the container. If the explosive load is decreased too much, the angle of deflection of the walls 0, by the impact of the driver would become too small to sustain the substantially head-on (uniform) shock in the sample and the shock in the sample would become appreciably oblique and of substantially non-uniform strength. When the explosive load is increased to the point where it just exceeds the critical amount, a substantially uniform transverse shock will span the sample just at the collison region. Under these circumstances the energy of the driver will be divided between that dissipated in the collision (see Eq. 29 below), and that required to sustain the transverse shock in the specimen (see Eq. 3 above), plus secondary losses. If the explosive load is increased beyond this critical value the transverse shock will be forced to take up a position ahead of the collision region, as indicated by S in FIG. 2. The pressure behind the transverse shock will cause the specimen and container to expand, thus increasing the collision angle and increasing the energy dissipated in the collision process. A schematic drawing of the instantaneous pressure-distance profile along the axis of the specimen is shown in FIG. 2A. The pressure immediately behind the shock is determined by the nature of the specimen and by the detonation velocity. So long as the transverse shock configuration is maintained, the shock pressure does not vary with increasing explosive load. However, when the shock is forced ahead of the collision region as shown in FIG. 2, the pressure rises further behind the shock front, reaching a maximum at the collision region where the cross-sectional area of the specimen is at a maximum. The pressure then falls smoothly as the cross-sectional area decreases.

There are several advantageous features in the axial shocking technique and in the driver arrangement shown in FIGS. 1 and 2. First of all there is the good uniformity of treatment of the specimen material. There is also a considerable degree of flexibility in the selection of the pressure-time history to which the specimen is exposed. In addition to the variations which may be obtained by modifying the initial porosity of the specimen material, the shock pressure and the associated irreversible heating of the material may be varied over a considerable range by varying the detonation velocity. While holding the shock pressure and irreversible heat input constant, the maximum pressure can be increased by increasing the explosive load. If the driver and container thicknesses are held constant while the explosive load is increased, the pressure maximum and duration of the high pressure portions of the pulse are increased, but the time scale of the pressure decreases behind the collision will be little affected. On the other hand, increasing the thickness of the driver and container with a small increase of explosive load to compensate for increased secondary energy loss, will tend to have little effect on the maximum pressure, but will increase the time scale for the decay of the pressure behind the pressure maximum. The time scale can of course also be increased by increasing the scale of the whole arrangement, including the diameter or thickness of the specimen. The fact that the driver tube confines the container is a great advantage in simple recovery since the specimen after shocking is contained in a strong heavy-walled tube.

As already indicated, the driver technique can be applied to materials which do not require containment, although a thin layer of the material near the surface may be lost or damaged by the jetting process. A typical case would be the shock treatment of a material dispersed as small porous particles in a substantially solid metal matrix. Unless the specimen is a metal of high percent relative density, e.g., at least about 80%, a metal container will usually be employed. Also, a container will be used when the specimen becomes molten at the shock pressures employed.

There are several variations of the driver technique which may be employed. For example, the driver may be placed at a small angle to the specimen or container, rather than parallel. By detonating the explosive from the end at which the stand-off at least, a condition can be achieved in which the velocity of the collision along the specimen is less than the detonation velocity, thus allowing the use of an explosive with a higher detonation velocity than would be used to achieve the same axial shock velocity with a parallel driver. To maintain a constancy in collision velocity, it is necessary to ensure constancy in the driver velocity over the varying stand-off caused by the angle. Much greater difficulty in achieving constant velocity would arise in cylindrical systems, due to convergence effects, as compared to the flat slab arrangement. Alternative to the use of detonating explosives in the present process, in the flat slab arrangement a plane driver plate placed at the appropriate initial angle could be driven in a direction perpendicular to its surface by a non-detonating means, such as a compressed gas gun or a gun employing a charge of deflagrating explosive.

Regarding the magnitude of the pressure pulse that must be applied to the specimen or its container by the driver, i.e., requirement (1), where the specimen and driver are parallel, the pressure applied to the specimen should be at least about $P_1$ (Eq. 13), the pressure applied to a tubular container being as defined in Eq. 28, $P_x$ in this case being replaced by $P_c$, the pressure to be applied to a tubular container to give a pressure $P_1$ in the specimen. With a flat specimen, the driver(s) can initially be arranged at an angle to the lateral boundary or boundaries, in which event D in Eq. 13 becomes collision velocity, the relation between collision velocity and D being as defined in U.S. 3,264,731. As previously noted, significant pressure oscillation in the driver and container (if any) is avoided by causing jetting to occur upon collision of the driver with the container or specimen. When jetting occurs a very high pressure which is termed the stagnation pressure, $P_{s_j}$, attained at the collision line, $P_{s_j}$ being defined by $$P_{s_j} = \rho_m V_c^2 / 2 \qquad \text{(Eq. 28A)}$$

where $\rho_m$ is the initial density of the less dense jetting material and $V_c$ is the collision velocity, which as already noted will usually equal D. When $P_{s_j}$ exceeds $P_1$ or $P_c$, requirement (1) is met. Thus this requirement is easily met for any given collision velocity simply by choosing driver or container materials whose dsntity is such that $P_{s_j}$ will exceed $P_1$ (Eq. 13) or $P_c$ (Eq. 28).

The energy required to sustain the desired transverse shock configuration has been stated in terms of the energy supplied through the boundaries of the specimen itself. In order to facilitate determination of workable conditions in a particular application, it is desirable to relate this requirement to the mass of a driver and the velocity to which the driver must be accelerated, e.g., by the detonation of a suitable explosive load. A simple procedure can be developed for an idealized case in which the driver and container are of high density and thin compared to the material being treated. In this situation the angle between the axis and the flow lines (in a steady-state coordinate system moving with the pressure pulse and the detonation velocity D) is always small, so that transverse gradients in the contents are negligible, and the one-dimensional channel flow treatment may be applied. Furthermore, since the walls are thin, velocity gradients across the driver and container are negligible even though very high pressure gradients may be developed by deceleration against the contents. This situation would be approximated in the case of a low-density material (e.g., $\rho<2$) being pressurized to modest pressures (e.g., up to 100 kilobars) with a relatively dense container and driver ($\rho\sim8$) whose combined thickness is less than ½ the specimen's thickness. However, as already noted, a great advantage of the driver method over the method using direct explosive loading is the ability to shock materials to much higher pressures (several hundred kilobars). In that case the deviation from the ideal case may be appreciable, and the direction and magnitude of the deviation should be evaluated.

The manner in which the requirement on the driver may be specified in the idealized case is considered fiirst. For the preferred subsonic case where there are no oblique shocks to dissipate energy, the driver energy requirement can be specified by considering the impact of the driver against the container. Whether the assembly is plane or cylindrical is immaterial. The effect of the impedance of the specimen material on the energy dissipated by the collision is neglected, i.e., it is assumed that the container is unbacked. Energy lost in the collision can be obtained from the fact that downstream from the collision the driver and container have the same velocity (measured in laboratory coordinates), and from the fact that the momentum of the jet is negligible when the collision angle is small, as is the case in practice. The energy loss through jetting per unit area of interface is $$E_j = \frac{1}{2} \frac{m_1 m_2}{m_1 + m_2} V_p^2 \qquad \text{(Eq. 29)}$$

where $m_1$ is the mass per unit area of the driver, $m_2$ is the mass per unit area of the container, both at the container-driver interface, and $V_p$ is the velocity at which the driver (in fixed coordinates) is approaching the container immediately before impact. The energy remaining as kinetic energy of the combined driver and contained $E_f$ is $$E_f = \frac{1}{2} m_1 V_p^2 - E_j = \frac{1}{2} m_1 V_p^2 \frac{m_1}{m_1 + m_2} \qquad \text{(Eq. 30)}$$

The remaining kinetic energy $E_f$ must at least equal the energy required to sustain the desired substantially uniform transverse shock in the specimen material, plus the energy loss in plastic deformation of the driver and container. Energy loss in the container is determined as described above in connection with the direct explosive contact technique. Energy lost through plastic deformation of the driver up to the point where it collides with the container has already been taken into account in Eq. 30. Subsequent energy loss will be about the same as for a container of the same thickness and is accounted for in the same way.

The same relations will apply in the supersonic case in which detached shocks occur in the driver and/or container, so long as the aforementioned jetting requirement is met. Less energy is dissipated in the jetting process, but the balance of that given by Eq. 28 is expanded in the detached shock waves.

The preferred method of determining the energy requirement is by considering the momentum balance in the process. This has the advantage of automatically accounting for the significant secondary energy losses including jetting and being easier to translate into explosive loading. A momentum balance can be drawn most readily in the plane symmetric case. The total force on the plane of symmetry in the center of the slab specimen must equal the total force exerted by the propulsion system which produces the motion of the driver plate, e.g., the total force exerted by detonation of an explosive layer on the driver plate. The force on the plane of symmetry can be equated to the rate of change of momentum of the driver plate caused by the detonation. Thus, $$\int Pds = m_1 DV_p \qquad \text{(Eq. 31)}$$

where P is the pressure at the central plane, $s$ is the axial distance, measured downstream from the transverse shock in the specimen, $m_1$ is the mass per unit area of the driver plate, D is the steady-state velocity of the whole configuration in the axial direction, i.e., the detonation velocity; and $V_p$ is the velocity at which the driver plate is approaching the container immediately before impact. The left side of Eq. 31 represents the force per unit width of the specimen. The quantity $m_1 D$ represents the mass per unit width of the driver plate swept up in unit time and given a perpendicular velocity $V_p$.

For a given specimen, and given values of D, $m_1$, and $m_2$ (mass per unit area of contained; $m_2$ is zero if a container is not employed), specification of $V_p$ requires a knowledge of $\int Pds$, and therefore a knowledge of how P varies with $s$ downstream from the desired transverse shock. This can be carried out in a straightforward way in the idealized case of a relatively thin and dense driver plate and container, as in the case of the energy balance. In this case the speed of the driver plate and container is constant (with value D) in the steady-state coordinate system and the walls are deflected by small angles by the pressure of the specimen. Considering the acceleration of unit area of walls with mass $m_w = m_1 + m_2$, then $$P = \frac{m_w dV_w}{dt} = \frac{m_w d^2 y}{dt^2} = m_w \frac{d^2 y}{ds^2} \left(\frac{ds}{dt}\right)^2 = m_w D^2 \frac{d^2 y}{ds^2} \quad \text{(Eq. 32)}$$

where $t$ is time and $y$ is the lateral position of the wall which is directly proportional to the cross-sectional area of the specimen. From the isentrope of the specimen and Eqs. 9 and 11, the relation between the pressure P and the cross-sectional area A is known. Thus Eq. 32 may be integrated numerically to obtain the variation of $y$ and $V_w$ with axial distance $s$. The integration is backwards from a point approaching the final downstream condition in which $P = P_f$ (usually $=0$) and $V_w = 0$. (If $P_f = 0$, it is necessary to assume a small value for P to commerce the integration.) Since the desired configuration is that in which a planar shock wave spans the specimen, the integration is continued up to the point where $P = P_1$, the pressure behind a transverse shock with shock velocity $U_s = D$. Then, $$\int_{P_f}^{P_1} Pds = m_w DV_w = m_1 DV_p \qquad \text{(Eq. 33)}$$

for the rate at which momentum must be supplied by the driver, $m_1$ being the mass of the driver and $V_p$ being its velocity. (In the symmetrical case which has been considered, an equal and opposite momentum must be supplied by the opposite driver plate.)

If the momentum of the driver plate is greater than the minimum required, the transverse shock will be driven slightly ahead of the collision region thus increasing $\int Pds$ to match the increased momentum rate.

The momentum balance also provides information on the duration of the pressure on the specimen, since the pressure-time curve may be obtained from the $P-s$ curve using the relation $$t = \int \frac{ds}{q}$$

(Eq. 34)

where $q$ is the velocity of the specimen (Eqs. 9+11).

The non-ideal case will now be considered. Transverse velocity gradients in both the specimen and walls (driver and container) become important. The high pressure behind the shock in the specimen has a large effect on the amount of energy dissipated in the collision of the driver with the container. The momentum balance of Eq. 31 still applies, but an evaluation is needed of the effect of the transverse gradients on the relation between P and $s$. To obtain the same rate of contraction of the specimen in the non-ideal case as in the ideal case, a smaller mass per unit area of the wall is required. This is due partly to the transverse velocity gradient in the specimen, which reduces the pressure at the interface with the wall below the pressure at the central plane of symmetry, and partly to the fact that the transverse velocity of the outer portions of the walls is increased because of the thickening of the walls in the high-pressure regions. To evaluate the form of $y$ (the lateral distance from the central plane to the interface between specimen and wall) as a function of axial distance , $s$ is assumed to be the same for the actual case with walls of mass per unit area $m_w$ as for the ideal case with a greater mass $m_1$. Calculation of the ideal case with an assumed value $m_1$ allows an estimate to be made of the angle of convergence of the specimen wall interface at the position where the pressure P equals the shock pressure $P_1$ behind the desired transverse shock. Using this convergence angle, the transverse momentum in the specimen can be estimated, e.g., by assuming a uniform gradient in transverse velocity. From the properties of the wall material, an estimation of the transverse momentum of the wall can be made, taking account of the thickening of the wall, e.g., by assuming a uniform pressure gardient through the wall. The ratio $m_1/m_w$ should be chosen to give agreement between $\int Pds$ and the estimated transverse momentum of specimen and wall. In estimating the thickening of the wall, the compressibility of the wall material should be taken into account, since the steady-state flow velocity will generally be near a Mach number of 1 (the sonic velocity). The variation of pressure with the cross-sectional area of a stream tube can be obtained from the isentrope of the wall material and the upstream steady-state velocity (=D) from Eqs. 9 and 11, as for the specimen material.

A further increment to the momentum rate should be added to allow for a transition from the axial flow immediately behind the desired plane transverse shock front to the converging flow at the start of integration of the wall deceleration in the calculation; a value of $P_1 y_0/2$ is reasonable, where $P_1$ is the shock pressure and $y_0$ is the initial half-thickness of the specimen.

Although momentum balance can be applied directly only to the plane case, the driver tube velocity in a cylindrical arrangement can usually be determined with sufficient accuracy by applying the momentum considerations to the plane case of equivalent mass per unit area of the specimen interface with the container, computing the energy requirement, and assuming the energy requirement per unit mass of specimen is the same in the cylindrical case. This is illustrated in Example 7.

Having determined $V_p$ from the energy required, the amount of explosive required to provide a desired driver plate velocity or driver plate energy can be determined experimentally by well-known methods for measuring plate velocities. For some configurations, theoretical formulas relating the plate kinetic energy to the explosive energy and the ratio of explosive mass to plate mass are available. For example, in the case of a flat plate driven by a layer of unconfined explosive, a "Gurney-type" formula given by N. E. Hoskin et al. in Preprints of Papers presented at Fourth Sympossium on Detonation, Oct. 12–15, 1965, U.S. Naval Ordnance Laboratory, Silver Spring, Bd., vol. 1, pages A5 to A15 (The Motion of Plates and Cylinders Driven by Detonation Waves at Tangential Incidence), can be used. This is illustrated in Example 7.

As discussed above in the case of direct explosive contact, it is not necessary to impact the specimen by a driver over all of the lateral boundaries, provided the non-impacted boundaries are supported by thick high impedance members capable of supporting the desired specimen pressures without undue energy loss. In this case, the driver must supply enough additional energy to compensate for the loss in energy to the passive support member. For example, the production of diamond from graphite can be carried out by using a massive steel slab to support a flat layer of a mixture of metal powder and porous graphite, covered with a thin flat steel sheet. A flat metal driver plate of suitable thickness is supported at its edges to provide a uniform stand-off gap for the driver plate acceleration, and a uniform layer of explosive is placed on the driver plate and initiated from a line or point, preferably at one end. In such an arrangement, the driver plate velocity $V_{p_b}$ required with a backer of mass $m_b$ per unit area supporting a layer of specimen equal to one-half the thickness of specimen in a comparable symmetric case for which the required plate velocity is $V_{p_s}$ is increased to make the change in velocity, $V_{p_b} - V_b = V_{p_s}$, where $V_b$ is the velocity of the whole assembly after shocking. Using the conservation of momentum $$V_{p_b} = V_{p_s} \left[ \frac{m_1 + m_2 + m_s + m_b}{m_2 + m_s + m_b} \right] \quad \text{(Eq. 35)}$$

where $m_s$ is the mass per unit area of the specimen.

When the requirements on the pressure pulse and the means for generating it are determined in the manner described above for any given solid specimen and desired shock pressure ($P_1$), the specimen, once steady state conditions are reached, will be subjected to a substantially uniform shock wave which has a maximum shock pressure of about $P_1$ and which spans a major portion of the specimen between its lateral boundaries, and this shock wave will move in the axial direction through the remainder of the specimen. Additionally pressure decay behind the shock will be uniform as the shock wave moves in the axial direction. Thus the specimen has a substantially uniform pressure-time history. Stated differently, over the length of the specimen subjected to steady state conditions, more than 50% of its cross-sectional area will be subjected to a shock pressure equal to at least 50% of the desired shock pressure $P_1$. Where measurements of values are mentioned in the foregoing calculations, measurements will generally give more accurate determinations of pressure requirements than the disclosed computational method of determining the same values. Nevertheless, the foregoing shock configuration will generally be achieved. Where alternative methods of calculation are given, the method stated to be preferred should be employed if the substantially uniform shock configuration is to be achieved with little if any experimentation and the alternate method used as a guide to indicate order of magnitude. The latter is also true where it is expressly stated that given numbers are typical values.

In any instance where a desired uniformity of results is not obtained, better conditions, and even conditions that will give the practically ideal shock configuration are easily determined with a limited amount of experimentation. The shock configuration attained in any particular instance may be examined. For example the specimen may be terminated by a transverse flat surface covered by a thin reflecting mirror or by an argon-filled flash-gap covered with transparent plastic, and the arrival of the shock wave at this surface can be viewed by a high-speed streak camera. Alternatively the configuration of the shock and the downstream contraction of a cylindrical specimen can be viewed laterally by means of a short-duration flash X-ray apparatus. Well-known geometrical scaling procedures can be used to obtain dynamically similar models of large production shots of a size that may be used in close proximity to the measuring equipment. The shock angle can readily be converted to shock pressure using the Hugoniot curve of the specimen.

Variation of the shock pressure across the specimen can also be determined from observations on the recovered specimen. The nature of these observations of course will vary depending on the particular material and the nature of the changes for which the shock treatment is being done. One example is the conversion of non-diamond carbon to diamond in a cooling matrix, under conditions such that a good diamond yield is obtained at a shock pressure which does not cause complete melting of the cooling matrix. In this case the yield of diamond can be determined as a function of the radius of a cylindrical specimen. If a few experiments are performed in which the detonation velocity is decreased, with all other variables held constant, the shock pressure at the axis (where the shock is known to be head-on) is decreased to values that can readily be computed from the detonation velocity and the Hugoniot curve. Measurement of the diamond yield at the axis then gives the relation between diamond yield and shock pressure. The values of diamond yield versus radius from the first (higher velocity) shot can then be used to determine shock pressure as a function of radius.

Another example of how observations on the recovered specimens can be used to determine the variation of shock pressure across the width of a specimen concerns the conversion of graphite to diamond in a copper cooling matrix under conditions such that an excellent diamond yield is obtained at shock pressures for which the diamond-copper equilibration temperature is well above the melting point of copper (1083° C.). The regions of copper that completely melt may be easily identified on subsequent examination of the recovered diamond-copper material because of its different microstructure. The boundary of the completely melted region indicates that at this radius (over 95% of the total specimen radius in Example 1) the shock pressure had fallen to a value which just causes complete melting of the copper. This level may be determined by carrying out experiments at reduced values of the detonation velocity, with all other variables held constant. The value of D at which complete melting is just obtained along the central axis is the value of the shock velocity $U_s$ which just gives melting; the corresponding shock pressure can be obtained from the Hugoniot of the specimen. Furthermore the variation of pressure with radius (and the planarity of the shock front) can be obtained by noting how quickly the radius of the completely melted region varies as the detonation velocity is varied. If over a narrow range of D (for which the range of axial shock pressure P may be obtained from the Hugoniot curve), the radius of the completely melted region ranges from zero to nearly 100% of the specimen radius, the shock configuration is good, and the range of variation of shock pressure with radius is small. On the other hand if the radius of the completely melted region rises gradually over a considerable range of variation of the detonation velocity, there is a considerable range of pressure variation across the specimen. The foregoing techniques apply equally as well to other desired changes, whether they be phase changes or chemical reactions. Where, e.g., compaction is the desired effect, the uniformity of results across the specimen can be determined microscopically. Explosive loading or detonation velocity can then be varied as in the first approach described above to determine conditions that give practically uniform densification across the specimen.

The effect of increasing the mass and velocity of the explosive beyond the point where a plane transverse shock spans the speciment in the collision region, thereby causing the shock to be driven ahead of the collision region, can also be determined experimentally in the foregoing manner. Generally, if the density of the shocked material is high (e.g., equal to the container and driver densities), and if the container is thin, substantial overloading can cause significant curvature of the shock and inadequate shock pressure in the outer portions of the specimen. The shock curvature can be reduced by increasing the thickness of the container, if it is desired to maintain a high, or even increasing, pressure for some distance behind the shock; otherwise the loading can be reduced. In the case where the density of the shocked material is substantially less than that of the container and driver, a transverse shock may be driven well ahead of the collision region without substantial curvature, provided the container thickness is at least about 0.25 times the minimum transverse dimension of the specimen. In such case the peak pressure can rise substantially above the shock pressure.

While the present process can be used to shock treat any solid material with high transient pressures, it is employed with particular advantage in cases in which uniformity of treatment and flexibility in the selection of the pressure-time history to which the material is subjected are especially useful, and when sample recovery is a problem because of tensile stresses which tend to make the specimen explode laterally, i.e., in the direction of their minimum transverse dimension. For these reasons, the process will find its greatest utility in systems in which phase transformations occur and in which refractory-type materials such as silicon carbide and the like are to be densified to form strong bodies.

As shown in the following examples, the cylindrical driver technique of this invention gives better yields of diamond from non-diamond carbon when compared to the yields obtained by previous transient pressure methods and alo permits excellent recovery of the diamond product even when the synthesis is conducted with graphite dispersed in a cooling medium which melts during the process. Thus the instant invention provides, inter alia, an improvement in the diamond synthesis exemplified in aforementioned U.S. Pat. 3,401,019 the disclosures of which are incorporated herein by reference. The improved results obtained by the present process are due to its ability to subject the majority of the specimen to near optimum pressures for diamond synthesis and to release these pressures smoothly to ambient conditions. The preferred conditions for synthesizing diamond according to this invention are as follows. The specimen is an intimate mixture of 3 to 12%, by weight, non-diamond carbon, preferably graphite, and a metal cooling medium such as copper, iron, nickel or aluminum, with copper being preferred because of its excellent thermal conductivity. The percent relative density of the cooling medium, i.e., exclusive of pores containing carbon, is at least about 95% and the carbon has a percent relative density of about from 20 to 80%, and preferably about 35 to 65%, calculated by assuming the cooling medium is 100% dense and subtracting its known volume from the total volume of the specimen. The specimen is confined in a circular metal cylinder (container) of high-impedance metal such as steel. The container is coaxially aligned within a circular metal driver cylinder of about the same impedance as the container. Standoff (space) between the facing surfaces of the container and driver is about 0.25 to 10, and preferably about 1 to 6, times the driver thickness. The mass of the driver is at least about 0.3 times that of the specimen plus container, per unit length. Surrounding the driver is a mass of explosive equal to at least about 1.5 times the mass of the driver per unit length, the ratio increasing to about 8 as the carbon content in the specimen increases from 3 to 12%. Generally there is no advantage in having this mass ratio exceed about 10. The detonation velocity of the explosive is about from 3000 to 6000 meters/sec., the higher velocities being used with the higher density carbons. Detonation velocities of about 4000 to 5000 m./sec. are particularly preferred. The explosive is initiated with circular symmetry so that the pressure pulse applied by impact of the driver with the container is uniform around the circumference of the container in a plane perpendicular to its longitudinal axis and moves at the detonation velocity in the axial direction.

When diamond is synthesized by the above process, coherent, fine-grained polycrystalline diamond particles are obtained which have a unique microstructure. This microstructure is characterized by a bimodal crystallite size distribution, single coherent particles containing a population of very small, blocky, variously oriented crystallites, typically having diameters in the 10–40 A. range, interspersed with much larger blocky, unoriented crystallites, typically having diameters in the 100–1600 A. range, and mean diameters in the 200–600 A. range.

Such a microstructure is readily distinguishable from that of diamonds heretofore known to the art. Although the size of the crystallites in polycrstalline diamond particles known to the art varies from one type of diamond to another, e.g., natural or synthetic polycrystalline types, individual particles of each type of diamond have a crystallite size which is quite uniform. For example, particles of meteoritic diamond or diamond synthesized by the process described in U.S. Pat. 3,238,019 are reported to have fine-grained polycrystalline structures with crystallite size distributions peaked at about 100 A. Particles of polycrystalline diamond made by the processes described in U.S. Pats. 3,401,019 and 3,399,254 also have rather uniform crystallite size distributions although the average crystallite size can vary widely from particle to particle. The average crystallite size within particles of these types of diamond ranges from 10 A. to 400 A. for particles composed of blocky crystallites. Particles of carbonado have crystallite size distributions peaked at about 1000 A.

The bimodal size distribution of the contiguous crystallites in diamond particles made by the process of this invention is revealed by both electron microscopy and electron diffraction. Those accustomed to viewing the electron micrographs of natural and synthetic diamond will discern, in the diamond powder of this invention, the characteristic presence of two populations of crystallite sizes bonded together in the individual particles, typically with the ratio of the average diameter of the population of larger crystallites to that of the contiguous population of smaller crystallites equal to 5–50:1. The presence of these two populations is easier for the untrained observer to discern in electron diffraction patterns obtained from particles of this type of diamond. The pattern is distinctive in that the electron diffraction rings show no strongly preferred direction of crytallite orientation in the 100–1600 A. crystallites, but the rings do exhibit a population of discrete spots (which are reflections from the population of large crystallites) superimposed on a diffuse diffraction pattern (which is the diffraction pattern of the population of small crystallites). Although the bimodal crystallite size distribution may not be evident in every particle examined, at least about 10%, usually at least about 50%, and often more than about 75% of the particles examined at random from a mass of diamond powder obtained by crushing the powder made by this process can be shown to have such a microstructure as revealed by electron diffracttion and/or electron microscopy. Unless the particle size range of the powder to be examined is quite small, e.g., 0–4 microns, crushing is necessary to produce particles thin enough to transmit electrons, e.g., less than 2000 A., and preferably less than 1000 A., in thickness.

With regard to the density of the discrete spots in the diffraction pattern, at least about 50 spots usually are to be found on the 111 reflection ring. For those samples having an extremely large number of spots on the 111 reflection ring, the background ring is best seen on the 220 and 311 rings. This diffraction pattern is obtained by using an electron microscope in the selected area of diffraction mode of operation, with the incident electron beam vertically parallel, the selected area of the image plane contributing to the diffraction pattern being about $0.7\mu^2$, of which at least $0.2\mu^2$ of the selected area is occupied by diamond sufficiently thin to give a Gaussian image, the selected area contributing to the diffraction pattern being over a hole of a holey carbon film specimen support grid.

Evidence of the coherence of the diamond particles of this invention is that they survive standard milling operations that round off the edges and corners of the particles without excessive size reduction.

The utility of diamond having this structure is revealed by its performance in lapping tungsten carbide. It is well known that the lapping performance of diamond particles is strongly influenced by both the shape and the friability of the individual particles, strong, blocky particles performing better than elongated or laminar particles. The desired strong, blocky particles generally are formed by subjecting diamond powder to any one of a variety of milling or shaping operations. The ease with which this shaping can be achieved, without excessive attrition of the diamond and production of excessive amounts of fines, depends upon both the initial shape, the strength, and the fracturing characteristics of the diamond particles. The diamond of this invention is particularly easy to shape satisfactorily. As shown in Example 6, the polycrystalline diamond of this invention, after undergoing a standard milling treatment to shape the diamond particles, laps tungsten carbide at an appreciably faster rate than commercial diamond made according to the examples of U.S. Patent 3,401,019 and milled under the same conditions. This superior performance is a result of the greater ease with which this new type of diamond can be shaped by milling to give blocky particles with rounded edges and corners.

In applying the cylindrical driver technique of this invention, and particularly when the sample becomes molten, e.g., as can be the case in diamond synthesis, difficulty may be encountered in preventing ejection of the sample from the end of the assembly where the shock wave exits. Although the sample can still be recovered, e.g., by permitting it to eject into a large water-filled collection basin, it is generally preferred to retain the sample within its initial container. The use of a tapered solid plug such as described in Example 1 reduces the abruptness of the reflection of the incident pressure wave on the plug, and thus reduces the load on the containing cylinder. Although this technique is satisfactory on small-scale shots, it may fail in large-scale shots under conditions required for good yields. For such shots we prefer to use the novel and closure described in the co-assigned application S.N. 804,199, now U.S. Patent 3,568,248, issued on Mar. 9, 1971 of George R. Cowan, filed on even date herewith and entitled "Plug Closure." The novel end closure described in that application comprises two sections. The first section, which is adjacent to the material being shocked, is designed to transmit the high pressure portion of the wave in the sample without substantial reflection; after passage of the pressure wave, it must constitute a solid plug of sufficient strength to retain the contents against the pressure associated with bringing the contents to rest. To eliminate shock reflection, the shock impedance of the plug material should closely match the shock impedance of the contents, at the shock pressure of the incident wave. It has been found that this impedance match can be obtained by using a porous plug of high-melting material (e.g., steal), with the porosity controlled to match the impedance. The plug material must have the property that after passage of the shock it is solid and of sufficient strength to retain the sample while itself being restrained by the outer cylinder (constituted of the original containing tube and the collapsed driver tube). Preferably the first section will have about the same bulk density as the sample.

The function of the second section of the closure is to carry off the momentum associated with the pressure wave without reflecting any wave, especially the tension wave that originates from reflection of the shock wave from the end of the plug, back up into the first section of the closure or any other part of the assembly. The momentum is carried off by spalling or separation of enough material to contain the high pressure wave. Satisfactory performance is attained when the impedance of the second portion matches the impedance of the first section. Separation of the second section, to prevent back transmittal of tension, can be assured by using a material that melts upon shock transmittal to constitute at least a layer of the second section adjacent to the first section. Alternatively the shock impedance of the second section can be made to decrease gradually or in small increments. While minimizing reflection of tension back into the first section, the decreasing impedance will cause the pressure wave to set up a gradient of particle velocity in the second section, thus causing it to disintegrate and carry off the momentum. This decreasing impedance can be obtained by increasing the porosity of the material in the second section, which can, if desired, be the same material as the first section.

A region of increasing porosity in the second section has also been found to be advantageous in providing positive retainment of the plug. The increasing porosity allows the cylindrical wall to collapse inward to a smaller diameter than that of the rest of the assembly, thus providing a tapered section through which the plug must be extruded before loss of the plug can occur. The tapered region also has been found effective in preventing leakage of the molten contents through small defects around the plug. To assure maximum reliability, both an increasing porosity and an end section that melts can be incorporated in the closure.

As a further precaution in preventing tension from being transmitted back from the end of the assembly, it has been found beneficial to cut a notch in the cylindrical driver to ensure carrying off of the axial momentum in the driver associated with the collision with the container. The notch should be located nearer to the end than the beginning of the increase in porosity in the plug, in order to form a tapered wall section of adequate length to reduce excessive plug motion.

It has been found that a small gradual decrease, or a decrease through small increments, in the porosity of the first section of the plug can be tolerated as long as the impedance is well matched at the interface with the contents. This has the advantage of decreasing the post-shock temperature of the less porous part of the plug, thus increasing its resistance to subsequent deformation. It also enables a greater taper to be obtained in the lower portion of the plug.

The dimensions of the plug are dependent on the particular application. The second or spall section should be at least about two diameters in length to ensure carrying off the momentum of the complete high pressure wave. The minimum length of the containment portion is dependent on the strength of the plug after shock passage, the strength and degree of taper in the containing cylinder, and the magnitude of the pressure required to bring the steady-state after flow of the contents to rest. A suitable plug construction is illustrated in Example 5.

The following examples illustrate various embodiments of the present invention. In Examples 1 to 5 and 7 to 9, the detonation velocity and loading of explosive are such that, once steady state conditions are reached, over 50% of the cross-sectional area of the specimen is subjected to a substantially uniform shock wave, moving in the axial direction at the exemplified detonation velocity.

Example 1.—An assembly for progressively converging a metal cylinder onto a metal cylinder containing a graphite sample for the purpose of synthesizing and recovering diamond under the conditions of the process of the present invention is constructed as follows:

The cylinder which is to hold the sample is a Type 1015 steel tube 13.6 inches long and having an outer diameter of ½ inch and a wall thickness of 1/32 inch. The tube has one closed, rounded end, the bottom end. The sample is a mixture of 8% by weight of natural graphite having an average particle size of $2.5\mu$ and 92% by weight of copper shot of a size such as to pass a 150-mesh, and be held on a 200-mesh, screen $(74-105\mu)$. Positioned inside and at the bottom of the tube in snug fit is a 2-inch-long brass rod attenuator having a conical cavity extending throughout its length, the apex of the cavity being at the flat end of the rod which is at the bottom of the tube. The apex angle is 2°30'. A portion of the sample mixture is pressed into the attenuator cavity under a pressure of 5700 p.s.i. Additional sample mixture is pressed under the same pressure into the tube over the mixture in the conical cavity, the additional pressed mixture extending over a length of 9.75 inches. The additional mixture is added and pressed incrementally in order to avoid an axial density gradient. The amount graphite in the sample above the attenuator is 10.38 grams. The density of the graphite in the sample is computed to be 39.8% from a volume obtained by assuming the copper is 100% dense, and subtracting the calculated volume of the copper from the known volume of the total mixture. A ¾ inch layer of silicon carbide (50/50 mixture of coarse and fine particle sizes) is packed over the sample to a density equal to about 70% of the theoretical. The silicon carbide is used to provide a "compressible" seal at the top of the tube. The top of the tube is closed by a 2⅛-inch-long, ½-inch-diameter steel plug in the form of a solid cylinder having three crimps evenly spaced lengthwise on its periphery.

The driver tube is a Type 1015 steel tube 18 inches long and having an outer diameter of 1 3/16 inches and a wall thickness of ⅛ inch. Fitting snugly inside this tube at one end, the bottom end, is a 9-inch-long steel rod attenuator having a conical cavity therein extending for 6 inches from an open end to the apex 3 inches from the opposite end, the latter closed end being the end nearer the bottom end of the driver tube. The steel attenuator has three ⅛-inch-deep grooves in its periphery along a 1½ inch length near the driver tube end. A ⅜-inch-thick steel plug fits snugly into the driver tube abutting the steel rod near the driver tube end, and the latter is closed off by a ⅛-inch-thick steel end cap pressing against the steel plug. The sample tube is inserted, bottom end in, in the conical cavity in the steel attenuator in the driver tube, the cavity apex conforming to the shape of the sample tube bottom for ½ inch and the cavity wall tapering away from the sample tube thereafter. In this manner, the sample and driver tubes are coaxially aligned with a 7/32 inch standoff between their facing surfaces at the top portions of the tubes where these surfaces are parallel. The remaining portions of the facing surfaces are at an angle to each other, i.e., gradually decreasing standoff. The effect of the attenuators is to thicken the driver and sample tube walls at the bottom end of the assembly so as to attenuate the shock in the sample tube.

The tube assembly is maintained in alignment at the top end by means of a circular cardboard disk fitting inside the driver tube near the top end, the disk having a central aperture to hold a ⅛-inch-diameter steel rod which connects into the steel plug at the top end of the sample tube. A steel end cap is epoxied onto the driver tube over the cardboard disk.

A 0.6-inch-thick, 18-inch-long layer of a sheet explosive of the type described in U.S. Patent 3,093,521 and comprising 20% very fine pentaerythritol tetranitrate (PETN), 70% red lead, and, as a binder, 10% of a 50/50 mixture of butyl rubber and a thermoplastic terpene resin [mixture of polymers of $\beta$-pinene of formula $(C_{10}H_6)_n$], commercially available as "Piccolyte" S–10 (manufactured by the Pennsylvania Industrial Chemical Corp.), is wrapped around the driver tube. The sheet explosive has a density of 3.2 grams per cubic centimeter and detonates at a velocity of 4400 meters per second. A disk of a PETN sheet explosive of the type described in U.S. Patent 2,999,743 and detonating at a velocity of 7200 meters per second (mass of sheet: 4 grams per square inch) is affixed to the edge of the cylindrical explosive layer as shown in FIG. 1 (10 is the disk), and an electric blasting cap is embedded in the disk at its center.

The tube assembly is encased in an 18-inch-long steel tube having an outer diameter of 5½ inches and an inner diameter of 2½ inches, the bottom end cap of the driver tube resting on a massive steel anvil. The space between the driver tube and encasing tube at the bottom of the assembly is filled with water. The sample tube and the space between the sample and driver tubes is evacuated to less than 1 micron pressure by means of a vacuum connection through the encasing tube and driver tube walls, small holes having been provided in the sample tube for this purpose. Evacuation of the sample tube (container) is a preferred procedure when the sample is porous.

Actuation of the blasting cap initiates the explosive disk, which in turn initiates the cylindrical explosive layer simultaneously at the entire periphery adjacent the driver tube. After the detonation of the entire 18-inch-long layer of explosive, the sample-driver tube assembly is recovered intact. The ends are cut off, and the sample and driver tubes are found to be firmly metallurgically bonded together in the form of a composite tube. The steel is machined down, leaving a thin wall around the sample. The sample portion of the tube is sectioned into 3 sections, the center section being 5 inches long and being worked up for analysis. The sample is very hard and difficult to cut. It is worked up as follows:

The sample is treated with nitric acid to remove the copper and steel, and the remaining solids (graphite plus diamond) are weighed, mixed with lead oxide powder, and the mixture is heated in air for 24 hours at 425° C. to oxidize the graphite. The oxidized mixture is treated with aqua regia to convert the lead oxide to water-soluble salts, and the remaining solids are then treated with an aqueous solution of the tetrasodium salt of ethylenediaminetetraacetic acid to dissolve the remaining lead salts. The solids are weighed again, and then subjected to X-ray diffraction procedures. The yield of diamond (weight of diamond divided by weight of diamond plus graphite obtained before oxidation) is 75.9%. Assuming the same yield for the entire sample, the amount of diamond obtained is 39.4 carats.

The outer sections of the sample are etched with a solution of ammonium hydroxide and hydrogen peroxide and studied under the microscope. It is observed that over about 92% of the cross-sectional area, the copper has melted and resolidified. A rim portion (of thickness equal to about 5% of the compacted sample diameter) remained unmelted. Thus, a shock wave of substantially uniform pressure has spanned about 92% of the sample's cross-section and has travelled through the linear specimen in an axial direction, the pressure having been less at the unmelted rim portion.

Example 2.—The procedure of Example 1 is repeated with the exception that the copper shot size is larger, i.e., it passes a 60-mesh, and is held on an 80-mesh, screen. The diamond yield is 62.9%. The thickness of the unmelted rim portion is equal to about 6.6% of the diameter of the compacted sample.

Example 3.—The procedure of Example 1 is repeated with the exception that the copper shot passes a 30-mesh, and is held on a 40-mesh, screen; the initial graphite density in the sample is 59.2%; and the explosive used is 0.6-inch-thick layer of explosive (35% PETN, 20% binder and 45% red lead, by weight; $\rho=2.6$ g./cc.; see U.S. Patent 3,093,521) detonating at a velocity of about 5600 meters per second. Again, the driver is metallurgically bonded to the container. The yield of diamond is 42.7%. The thickness of the unmelted rim portion is equal to about 10% of the diameter of the compacted sample.

Example 4.—The assembly used is that shown in FIG. 1 with the exception that a 1¾-inch-long brass rod attenuator having a conical cavity such as that described in Example 1 is placed at the bottom of the sample tube adjacent the steel end plug 4. The cone is filled with 40–50% dense silicon carbide. The assembly dimensions and explosive are the same as those in Example 1, except that the sample tube is 9 inches long, the driver tube 12 inches long, the explosive layer is 12 inches long, and the copper shot size is that used in Example 3. The graphite density is about 60%. The amount of graphite in the sample is 9.7 grams. The tube assembly is encased in a 12-inch-long steel tube having an outer diameter of 5½ inches and an inner diameter of 2½ inches, and rests on a massive steel anvil. The sample tube and the space between the sample and driver tubes are evacuated. The diamond yield is 42.4%.

Example 5.—The assembly used is substantially that shown in FIG. 1 with the following exceptions.

The sample tube is 119 inches long, and has a 4.5-inch outer diameter and 0.25-inch wall thickness.

The driver tube is 10 feet long, and has an 11-inch outer diameter and 1.25-inch wall thickness.

Contents of sample tube

At one end of the tube (the top end) is a 9.25-inch-long plug consisting in this case of 6 superimposed 4-inch-diameter pellets of steel powder pressed to a density of 79.5% (of the theoretical). Abutting this plug is the graphite/copper sample. The graphite/copper mixture is pressed into pellets from a dried water slurry containing 2% guar gum. The graphite density in the pellets is 51%. The pellets are placed in the sample tube so as to form a solid cylinder having a 4-inch diameter and 58.6-inch length, and weighing 113 pounds. After having been loaded in the tube, the sample is heated at about 250° C. for several hours. This decomposes the gum. Abutting the bottom of the sample is a steel plug section (38.5 inches long) consisting of a number of superimposed steel powder pellets of which the first four at the sample end have densities of 75, 76, 77, and 78% of theoretical, respectively, starting with the pellet abutting the sample; the next 19 pellets have a density of 79.5% of the theoretical; and the next two, 78 and 76%, respectively. Abutting the bottom of the steel plug is a 12.5-inch-long spall section of 6 pellets of the graphite/copper mixture used as the sample and pressed to gradually decreasing graphite densities as follows, from the end in contact with the steel plug: 50, 45, 40, 35, 35, and 35%. The spall section is welded to the sample tube. The spall section forms a momentum trap. In the bottom steel plug section, the density and shock impedance of the steel are matched to the density and shock impedance of the sample adjacent thereto (~75% steel density), thereby preventing reflection of the high pressure pulse. The gradually decreasing density in the spall section causes the tube to be driven in farther as the density decreases, thereby restricting the forward motion of the plug. A circumferential notch 5/16 inch deep and wide is made around the outside of the driver tube five inches from the bottom end.

Coaxial spacing between the sample tube and driver tube is maintained by two ¼-inch-thick steel circular spacer discs, one seated against the top plug and the other against the spall section, the discs being concentric with the tube axis and abutting the inner surface of the driver tube. The spacer discs are welded to the tubes.

Surrounding and in contact with the driver tube is an 11-foot-high cylinder 48 inches in diameter of an explosive composition comprising, by weight, a uniform mixture of grained 80/20 amatol (20% trinitrotoluene and 80% ammonium nitrate) and 35% sodium chloride (table salt). The total weight is 10,350 pounds. The explosive is contained in a corrugated steel culvert coaxial with the tubular assembly. The explosive is initiated axially at the top end of the tube assembly, five inches above a 2-inch-thick, 10.5-inch-diameter steel cover welded to the top of the driver, by means of an HDP–1 primer (see Du Pont Blasters' Handbook, 15th Ed., 1966, p. 66). The detonation velocity of the explosive is 4580 meters per second.

After detonation of the explosive, the spall section is found to have been ejected from the tube and the steel plug to have moved downward, with about 30–35 inches of plug remaining in the tube. The bottom five-inch section of the driver tube has sheared off at the notch. The composite tube assembly is cut open so as to expose the sample section. Melting of the copper is seen to have occurred over about 75% of the sample cross-sectional area, and in this zone there is segregation of the carbon from the copper. About 49% of the carbon content of the sample is removed as dry powder. This powder is 62% diamond.

Example 6.—Diamond particles in the diamond powder obtained by the procedure described in the above examples have a unique microstructure. The particles are coherent, polycrystalline particles formed of contiguous diamond crystallites having a bimodal crystallite size distribution. Over 90% of the particles examined at random from a sample of the powder obtained after crushing to produce particles thin enough to transmit electrons, give an electron diffraction pattern, obtained as described previously, characterized by diffuse electron diffraction rings upon which discrete diffraction spots are superimposed. In most of the patterns obtained, more than 50 spots are superimposed on the 111 reflection ring. The discrete spots are reflections from large crystallites, and the rings indicate small crystallites. Electron micrographs reveal particles containing a population of blocky, crystallites having diameters in the 10–40 A. range interspersed with blocky, unoriented crystallites having diameters in the 100–1600 A. range and mean diameters of 200–600 A. The ratio of the average diameter of the larger crystallites to that of the contiguous smaller crystallites is in the range of 5:1 to 50:1.

The particles are substantially pure diamond (>99%), and they are dense and strong, being held together by interatomic forces. The particles survive standard milling operations that round off the edges and corners of the particles without excessive size reduction.

The diamond particles are particularly easy to shape, and after undergoing a standard milling treatment, the powder gives superior performance in lapping tungsten carbide, as shown in the following table:

LAPPING PERFORMANCE OF TWO TYPES OF 6μ DIAMOND POWDER, BOTH SHAPED BY THE SAME STANDARD MILLING TREATMENT

| Material lapped | Wt. loss (grams) of material lapped per hour | |
|---|---|---|
| | Diamond of this invention | Diamond exemplified in U.S. Pat. 3,401,019 |
| Tungsten carbide CO-2 (6% Co; Rockwell A hardness: 92.0%) | .507 | .355 |
| Tungsten carbide CY-12 (13% Co; Rockwell A hardness: 90.0%) | .610 | .355 |
| Tungsten carbide CY-16 (8.5% Co; Rockwell A hardness: 91.3%) | .703 | .360 |

Example 7.—The manner in which the shock parameters may be computed for a given set of conditions is now shown with reference to the experiment described in Example 1. The following steps are illustrated: (1) determination of the Hugoniot curve to obtain the shock pressure and particle velocity, and of the isentrope through the shocked state to enable calculation of the energy required to sustain the shock; (2) application of the one-dimensional channel flow method to give the relation between pressure and cross-sectional area behind the front; (3) calculation of the P vs. axial distance(s) relation for the equivalent plane symmetric flow; and (4) estimation of the velocity imparted to the driver tube by the explosive.

(1) Hugoniot curve for specimen.—Since an experimental Hugoniot for the porous mixture that constitutes the sample is not available, it is necessary to measure or synthesize the Hugoniot curve from the equations of state of the two ingredients. Here the Hugoniot will be synthesized using a Mie-Grüneisen equation of state, with the Grüniesen parameter varying linearly with specific volume V from $\Gamma_0$ at $V=V_0$ to $\Gamma_\infty$ at $V=V_\infty$, corresponding to $P_H \rightarrow \infty$, where $U_s = C_0 + SU_p$, $\Gamma_0 = 2S - 1$, $$V_\infty/V_0 = (S-1)/S$$

and $\Gamma_\infty = 2(S-1)$. For non-porous copper $C_0 = 3.96 \times 10^5$, $S = 1.5$ and $V_0 = 0.112$ cc./g., from published Hugoniot measurements. For graphite shock-transformed to diamond, the Hugoniot curve is taken as that for diamond but with the initial internal energy adjusted to allow for the small difference in internal energy between graphite and diamond at ambient conditions. For non-porous diamond, $C_0 = 11.2 \times 10^5$ m./sec., $S = 0.95$ and $V_0 = 0.285$ cc./g. These values are based on sonic measurements, and the low-pressure value of $\Gamma_0$ obtained from the coefficient of thermal expansion, the heat capacity and the compressibility; they give a Hugoniot curve for pyrolytic graphite in good agreement with a measured Hugoniot curve for pyrolytic graphite in the pressure range around 1000 kilobars, where dense pyrolytic graphite transforms completely to diamond. The Hugoniot curve of a porous mixture is well-defined thermodynamically only when the mixture is so fine that temperature equilibrium is established behind the shock front before the subsequent rarefaction wave arrives. The method for synthesizing diamond by shocking a mixture of carbon and a cooling medium provides a high diamond yield because the shock produces initially a mixture with a high uniform pressure with graphite at a non-uniform high temperature and copper at a much lower average temperature. These conditions favor rapid transformation of graphite to diamond. The diamond formed is even hotter, because of the volume decrease occurring at high pressure; this tends to sustain or accelerate the transformation. Subsequently, and before the pressure drops to ambient, a substantial portion of the hot diamond must be cooled to below about 2000° C., where the rate of graphitization at zero pressure is negligible over short time intervals. The make-up of the starting material in Example 1 is designed to favor the above behavior—the copper is distributed as nearly spherical solid particles embedded in a porous graphite medium in which the porosity is distributed on a much finer scale. Considering now the type of non-equilibrium Hugoniot curves that apply to this non-equilibrium situation, the location of the Hugoniot curve, e.g., the volume V at a specified pressure P, is somewhat dependent on how the shock energy is distributed. If the fraction of the energy imparted to one component is increased, its volume will be increased due to the higher temperature; on the other hand, the volume of the other component will be decreased. Since the two volume changes do not necessarily cancel each other exactly, the total volume is changed. The variability of the Hugoniot curve can be examined by assigning the energy changes for the separate components as $P_1(V_0 - V_1)/2$, where $P_1$ is the shock pressure and $V_0$ is the assumed initial bulk volume of that component. This procedure automatically satisfies the required overall energy balance. The initial values of $V_0$ may then be varied in a way consistent with the specified bulk density of the mixture. This procedure indicates that the varability is small enough to be of no practical significance. The starting mixture (Example 1) is 100% dense copper and 39.8% dense graphite. The shock conditions selected are $P_1 = 400$ kb. for which $U_s = 4.292 \times 10^5$ cm./sec. Since D must equal $U_s$, D is $4.292 \times 10^5$ cm./sec. (The steady velocity D in Example 1 is $4.4 \times 10^5$ cm./sec. which means that $P_1$ is slightly higher than 400 kb., i.e., about 410 kb.). Some values from the Hugoniot curve are given in Table 1.

TABLE 1

| $P_1$(kilobars) | 100 | 200 | 300 | 400 | 500 |
|---|---|---|---|---|---|
| V (cc./g.) | 0.1208 | 0.1172 | 0.1143 | 0.1119 | 0.109 |
| $U_s$ ($10^5$ cm./sec.) | 2.278 | 3.142 | 3.775 | 4.292 | 4.73 |
| $U_p$ ($10^5$ cm./sec.) | 0.839 | 1.217 | 1.520 | 1.782 | 2.01 |

The isentrope through the 400 kbar shock is obtained by adding the volumes from the isentropes for the two separate components at each pressure, obtained from the equations of state noted above. Some values for the isentrope are given in Table 2.

The energy required to sustain the desired shock configuration can now be obtained from Eqs. 1, 2, 3, 5, 6, and 9.

$$E = E_1 - E_0 - (E_1 - E_2) + 1/2\, U_f^2 = (1.589 - .374 + .043) \times 10^{10} \text{ ergs/g.} = 1.26 \times 10^{10} \text{ ergs/g.}$$

(2) Relation between pressure and cross-sectional area.—The relation between the pressure P and the cross-sectional area of a stream tube A is obtained from the isentrope of the specimen, using Eqs. 11 and 11A with the $\int V dP$ being obtained numerically. Some typical values are shown in Table 2.

TABLE 2.—ISENTROPIC EXPANSION OF Cu/DIAMOND

| P (kbar) | V (cc./g.) | q (km./sec.) | $A/A_0$ | $D-q$ (km./sec.) |
|---|---|---|---|---|
| 694 | 0.1035 | 0 | ∞ | 4.292 |
| 600 | 0.1058 | 1.398 | 1.698 | 2.894 |
| 500 | 0.1086 | 2.024 | 1.203 | 2.268 |
| 400 | 0.1119 | 2.510 | 1.000 | 1.782 |
| 300 | 0.1157 | 2.928 | 0.887 | 1.364 |
| 200 | 0.1204 | 3.307 | 0.817 | 0.985 |
| 100 | 0.1262 | 3.660 | 0.774 | 0.632 |
| 0 | 0.1343 | 4.000 | 0.754 | 0.292 |
| 100 | 0.1455 | 4.335 | 0.753 | 0.043 |

It may be noted from Table 2 that the pressure can rise above the shock pressure of 400 kbar if the shock is forced ahead of the collision region so that the channel area can increase, but the pressure cannot exceed the stagnation pressure of 694 kbar corresponding to infinite cross-sectional area. The particle velocity (relative to fixed coordinates), $D-q$, is slightly positive at $P=0$.

(3) Relation between pressure and axial distance.—To proceed further, the dimensions and masses used in the example must be specified. The plane symmetric case will be considered, where the masses of the driver plate, $m_1$, container, $m_2$, and specimen, $m_s$, are expressed per unit area of the outer cylindrical surface of the sample before detonation. These values for the specimen, driver and container of Example 1 are:

$$m_s = 1.452 \text{ g./cm.}^2$$
$$m_1 = 6.061 \text{ g./cm.}^2$$
$$m_2 = 0.669 \text{ g./cm.}^2$$
$$m_w = m_1 + m_2 = 6.73 \text{ g./cm.}^2$$

The equivalent half-thickness of specimen $$y_0 = \frac{\pi (0.5556)^2}{2\pi (0.5556)} = \frac{(0.5556)}{2} = 0.2778 \text{ cm.}$$

Examination of Eq. 32 shows that the variables may be scaled as follows:

$$y \rightarrow ay \quad m_w \rightarrow bm_w \quad s \rightarrow cs$$

where the scale factors $a$, $b$ and $c$ are related by $c^2 = ab$ and $y$ is the half-width of the specimen at any distance $s$ downstream from the shock.

Eq. 32 can therefore be solved numerically for an arbitrary choice of $y_0$ and $m_w$, and the results then scaled to the particular case at hand; the solution, of course, applies only to the particular specimen and shock velocity. The numerical solution is obtained by writing Eq. 32 in finite difference form, where $h$ is a small increment of $s$ $$y(s+h) = 2y(s) - y(s-h) + \frac{h^2 P}{m_w D^2}$$

and beginning the computation at the downstream end where P approaches zero, but is arbitrarily assigned a small positive value (e.g., 1 kilobar) to permit integration. Some typical values of $s$, $y$, P, $dy/ds$ and $\int P ds$ are shown in Table 3 for a half-width $y_0 = 1$ cm., $m_w = 100$ g./cm.$^2$ and $D = 4.292 \times 10^5$ cm./sec.

TABLE 3

| $s$ (cm.) | $y$ (cm.) | P (kbar) | $dy/ds$ | $\int P ds$ (10$^{10}$ ergs/sm.$^2$) |
|---|---|---|---|---|
| 0 | .7536 | (1) | | |
| 4.292 | .7546 | 7 | .00068 | 1.55 |
| 8.584 | .7680 | 79 | .01143 | 17.28 |
| 10.73 | .8126 | 192 | .0298 | 48.56 |
| 12.88 | .9057 | 319 | .0596 | 106.2 |
| 13.73 | .9635 | 373 | .0757 | 137.0 |
| 14.197 | 1.000 | 400 | .0855 | 155.5 |
| 14.593 | 1.036 | 424 | .0943 | 172.3 |

As outlined above, $\int P ds$ will be estimated approximately for the actual (thick) wall by assuming that P versus $s$ is the same as that computed for an ideal (thin) wall of appropriate mass $m_1$, and estimating the effect of transverse velocity gradient in the wall on the transverse momentum of the wall. The relation between pressure P and stream tube area $(A/A_0)$ for the wall is obtained from the equation of state of 304 stainless steel. The tubes in Example 1 are ordinary steel, but the average behavior of steel is practically that of stainless steel. For stainless steel, $\rho_0 = 7.9$ g./cc. and the shock velocity $$U_s = (4.57 + 1.48 \ U_p) \text{ km./sec.}$$

A Grüneisen equation of state is assumed, with $\Gamma/V = 16$ g./cc. The insentrope (through $\rho = 0$) and the relation between P and $A/A_0$ are obtained as for the specimen. The velocity gradient in the wall is obtained by assuming a uniform pressure gradient in the wall at a point where the specimen pressure equals the shock pressure. The wall is divided into 4 equal layers and the rate of increase of thickness of each layer is estimated $[d(\Delta x)/ds]$, where $x$ is the distance into the wall from its interface with the specimen. From the slope $(dx/ds)$ and the flow velocity $(q)$ of each layer, the transverse velocity is obtained and averaged over the wall. (A more reliable treatment of the flow, both of specimen and wall, as a steady flow of compressible fluids, could be carried out by a computer if desired.) Assuming initially that $m_1$ (ideal) = $m_w$, the scale factors that must be applied to the quantities in Table 3 are $a = 0.2778$ and $b = 0.0673$, giving $c = .1367$ (from $c^2 = ab$); $dP/ds$ is scaled by $1/c$ and $\int P ds$ by $c$. The total wall thickness is $6.73/7.9 = 0.852$ cm. Values at various points through the wall are shown in Table 4, where the first line refers to the boundary of the specimen.

TABLE 4

| P (kbar) | $A/A_0$ | $dP/ds$ (kbar/cm.) | $d(A/A_0)/dP$ (kbar-1) | $d(\Delta x)/ds$ | $dx/ds$ | $q$ (km./sec.) | $v$ (km./sec.) |
|---|---|---|---|---|---|---|---|
| 400 | | 434 | | | .1722 | 4.292 | .740 |
| 350 | 1.156 | 380 | 8.67×10$^{-4}$ | .702 | .2073 | 3.202 | .664 |
| 250 | 1.084 | 272 | 5.80×10$^{-4}$ | .0336 | .2592 | 3.531 | .915 |
| 150 | 1.035 | 163 | 3.76×10$^{-4}$ | .0130 | .2825 | 3.843 | 1.086 |
| 50 | 1.007 | 54.3 | 2.30×10$^{-4}$ | .0027 | .2903 | 4.144 | 1.203 |
| $V_w$ = average $v$ = | | | | | | | .967 |

$$\int P ds = 21.24 \times 10^{10} \text{ ergs/cm.}^2$$

$$m_w D V_w \text{ (Eq. 33)} = (6.73)(4.292 \times 10^5)(0.967 \times 10^5) = 27.77 \times 10^{10} \text{ ergs/cm.}^2$$

The difference between these two values indicates that the value $m_1$ must be modified to bring these two quantities into agreement. This is done by varying $b$ by a further factor $\beta$, such that $$\beta^{1/2} \int P ds = m_w D V_w / \beta^{1/2}$$

so that $$\beta = \frac{m_w D V_w}{\int P ds} = \frac{27.77}{21.24} = 1.307$$

The new estimate of $$\int P ds = \frac{27.77 \times 10^{10}}{1.307^{1/2}} = 24.28 \times 10^{10} \text{ ergs/cm}^2$$

An estimate of the transverse momentum of the specimen (on one side of the symmetry plane), by assuming a uniform transverse velocity gradient, also is desired. We have $$m_s = 1.452 \text{ g/cm}^2, \ \theta = (dx/ds)/\beta^{1/2} = \frac{.1722}{1.142} = .1508 \text{ radians}$$

(at the boundary) and $q_1 = U_s - U_p$ (Table 1) for $P_1$ of 400 kb. = $2.51 \times 10^5$ cm./sec. The average transverse velocity is $$V_s = q\theta/2 = 0.189 \times 10^5 \text{ cm./sec.}$$

The rate of change of transverse momentum of the specimen is $m_s D V_s = 1.18 \times 10^{10}$ ergs/cm.$^2$; therefore, the value of $\beta$ must be changed to 1.372. The new estimate of $$\int P ds = m_w D V_w + M_s D V_s = (23.69 + 1.18) \times 10^{10}$$
$$= 24.87 \times 10^{10} \text{ ergs/cm.}^2$$

An additional increment to the total force per unit width to accommodate the transition from parallel flow behind the plane shock front to converging flow is estimated by the formula suggested above:

$$\Delta F = P_1 y_0/2 = 400 \times 10^9 \times .2778/2 = 5.56 \times 10^{10} \text{ ergs/cm.}^2$$

Addition of this increment gives $$\int P ds = 30.4 \times 10^{10} \text{ ergs/cm.}^2$$

as the rate of momentum per unit width of the specimen's lateral boundary, which must be supplied by the driver plate, i.e., $m_1 D V_p = 30.4 \times 10^{10}$ ergs/cm.$^2$. The minimum velocity perpendicular to the plate which must be imparted to the driver plate in order to sustain the desired transverse shock configuration at the steady axial velocity of $D = 4.292 \times 10^5$ cm./sec. is therefore $$V_p = 30.4/(4.292 \times 6.061) \times 10^5 = 1.168 \times 10^5 \text{ cm./sec.}$$

Since $V_p = D \sin \theta_d$, where $\theta_d$ is the angle by which the driver is deflected, then $\theta_d = 15.8°$.

Figure 3:
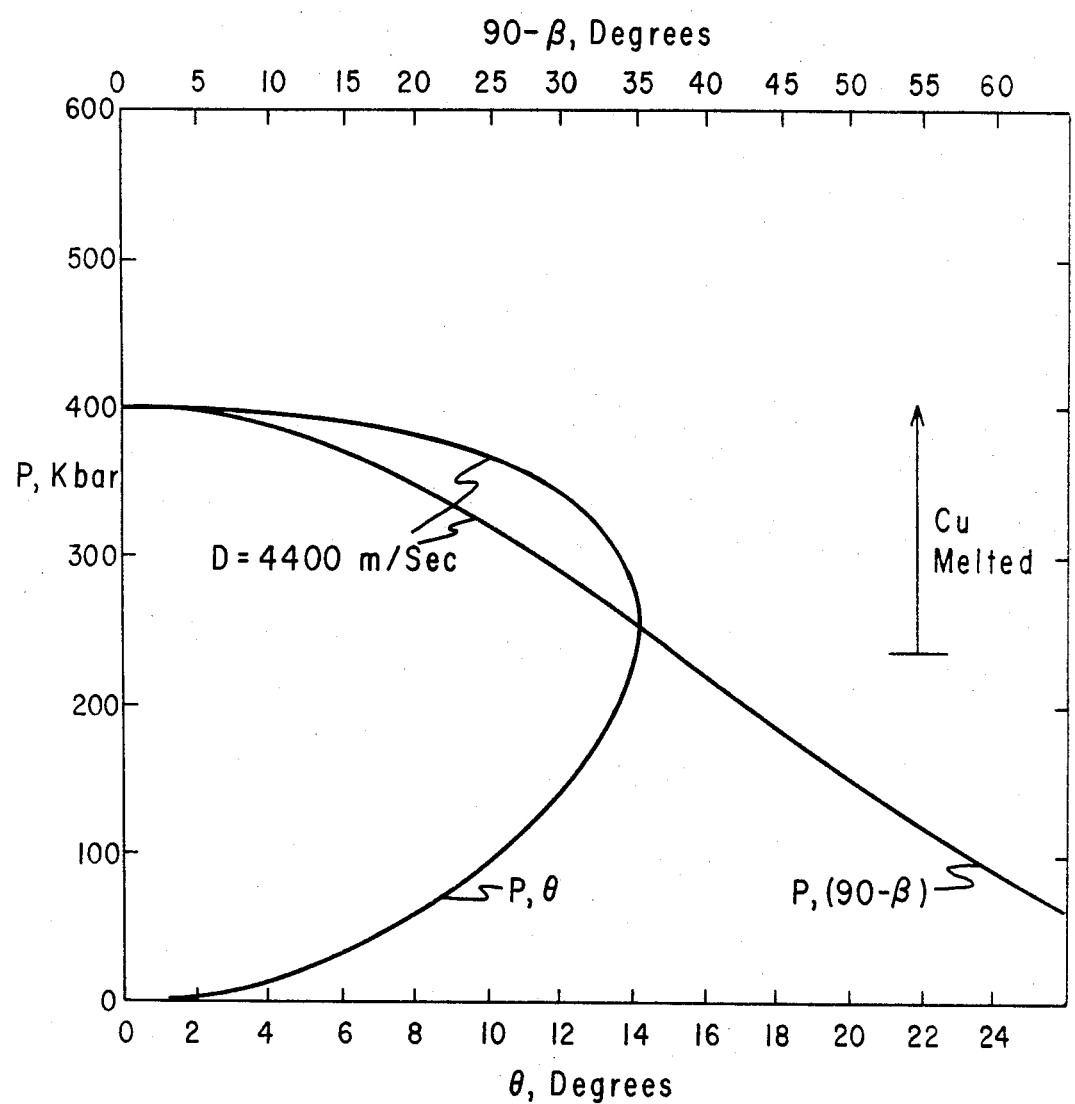
FIG. 3 is a shock polar computed for the conditions cited in Example 1.

We have found that a useful guide to the selection of the collision angle of the driver in cases where the driver mass exceeds the mass of the specimen is to make the driver angle slightly larger than the maximum angle $\theta$ on the shock polar of the specimen. In the present case, the maximum angle on the shock polar is about 14° (FIG. 3).

The energy supplied by the kinetic energy of the driver plate per gram of sample is $m_1 V_p^2 / 2 m_s = 2.85 \times 10^{10}$ ergs/gram, which may be compared to the energy required to sustain the shock configuration in the specimen, $1.26 \times 10^{10}$ ergs/gram. The difference between these two values is the energy consumed in the jetting process. It is interesting to compare the energy requirement computed for the ideal case of dense thin driver and container (Eq. 30) which equals $1.40 \times 10^{10}$ ergs/g.

(4) Estimation of explosive load.—The explosive load required to drive a tube or plate to a required lateral velocity at a specified stand-off may be determined experimentally by well-known methods. In the plane symmetric case the velocity of the plate, $V_{p_m}$, at large stand-off can be obtained from the appropriate Gurney formula with the effective explosive energy taken as $E_G = 0.6 \times$ (detonation energy). From Eq. 21, it is known that for a plate of mass $m_d$ driven by a layer of explosive of mass $m_x$, both per cm.$^2$ of initial interface between driver and explosive $$V_{p_m} = (2 E_G)^{1/2} \left\{ \frac{(1 + 2 m_d/m_x)^3 + 1}{6(1 + m_d/m_x)} + \frac{m_d}{m_x} \right\}^{-1/2}$$

The driver plate velocity at the instant of collosion will be somewhat less than the maximum value because of the finite stand-off distance Y over which the plate must be accelerated. The equivalent stand-off in the plane symmetric case may be taken as the volume swept by the unit area of the surface of the driver tube in contact with the explosive. It has been found that a good description of the velocity versus stand-off curves is given by the relation (Eq. 23)

$$\frac{Y P_x}{m_d V_{p_m}^2} = -\frac{V_p}{V_{p_m}} - \ln\left(1 - \frac{V_p}{V_{p_m}}\right)$$

where $P_x$ is the detonation pressure of the explosive.

For a detonation velocity $D = 4.4 \times 10^5$ cm./sec., the required plate velocity is increased from our estimate of $D = 4.292 \times 10^5$ cm./sec. in direct proportion to D, giving $$V_p = 1.168 \times 10^5 \times \frac{4.4}{4.292} = 1.20 \times 10^5 \text{ cm./sec.}$$

Using the values:

$$E_G = 0.6 \times 333 \text{ cal./g.} = 0.837 \times 10^{10} \text{ ergs/g.}$$

$$m_d = 2.235 \text{ g./cm.}$$

$$Y = 0.426 \text{ cm.}$$

$$P_x = 124 \text{ kbar.}$$

successive substitution of trial values of $V_{p_m}$ in Eq. 23 yields the desired $V_p$ when $V_{p_m} = 1.35 \times 10^5$ cm./sec. This value is obtained from Eq. 21 when $m_x = m_d \times 3.5 = 7.82$ g./cm. The actual explosive load used was 7.54 g./cm.$^2$. (The explosive was confined by a massive outer cylinder, which would tend to increase the driver velocity slightly, but this would tend to be counteracted by radial divergence in the expansion of the detonation products.) Therefore it is estimated that the explosive load and stand-off are slightly less than required to support a practically uniform shock spanning the entire specimen.

Examination of the specimen after shooting indicates that the copper has been completely melted over 95% of its diameter, and only a thin rim has remained unmelted. It is of interest to relate this observation to the shock polar for the specimen shown in FIG. 3. The shock polar gives the relation between shock pressure P and flow detection angle $\theta$ for a steady shock with an axial velocity D, and has been computed from the previously described Hugoniot curve for which it is assumed that the graphite is completely converted to diamond by the shock. Also shown is the relation between shock pressure and the angle $(90 - \beta)$ where $\beta$ is the angle between the axis and a tangent to the shock front. The post-shock equilibration temperature is calculated as a function of shock pressure. It is estimated that complete melting of the copper would occur for shock pressures exceeding about 240 kilobars.

The nearly complete melting therefore indicates that the shock pressure across nearly the complete specimen must have lain on the upper branch of the shock polar. The deviation of the shock from perpendicularity to the axis measured by $90 - \beta$, must therefore have been in the range from 0° to about 37° over about 90% of the specimen's cross section area. The pressure uniformity over this area as a percentage of $P_1$ is 100 (240/400)=60%. Over the central 50% of the cross-sectional area, the pressure is well over 75% of $P_1$.

For the particular specimen make-up used in Example 1 it has been found that the diamond yield is poor when the copper remains unmelted. Thus the achievement of a high yield in this specimen at the specified detonation velocity requires the existence of a transverse shock spanning the specimen with an angular deviation not exceeding about 37°. If the shock pressure exceeds about 450 kbar, the post-shock equilibration temperature exceeds about 2000° C., and regraphitization of the diamond reduces the yield.

It is of interest to estimate the conditions that would be obtained with explosive applied directly to the container, rather than to a driver tube. Even with a very high density explosive such as that used in Example 1, which has an unusually high detonation pressure of about 124 kilobars in relation to its detonation velocity (=4400 m./sec.), and with a very high explosive load, the maximum shock pressure in the plane case would be less than 50 kb. In the cylindrical case convergence toward the central axis would cause a rising shock pressure near the axis rising to 400 kilobars at the axis; however, because of the relatively low values of P and $\theta$ in the outer portions of the specimen, only an extremely small portion of the specimen would be subjected to pressures along the upper branch of the shock polar. The method would thus give substantially lower yields of diamond.

Example 8.—Silicon carbide powder is compacted by the procedure described in Example 1, with the following variations:

The sample tube and driver tube are made of Type 304 stainless steel. In the sample tube, the brass rod attenuator is 2.5 inches long. The bottom end of this tube is closed by a 2-inch-long, ½-inch-diameter steel plug in the form of a solid cylinder having three crimps evenly spaced lengthwise on its periphery. "FFF" silicon carbide (particle size 10–40µ) is packed into the attenuator cavity and for a distance of 4.9 inches above the attenuator, to a density of 60%. The next 5.7 inches is filled with silicon carbide powder of 1–5µ average particle size, also packed to 60% density. The standoff between tubes is ¼ inch. The explosive layer is 0.55-inch thick.

After the detonation of the entire layer of explosive, the cylinder assembly is recovered intact. The ends are cut off, and the cylinders are found to be firmly bonded together in the form of a composite cylinder, which is sectioned.

Photomicrographs of the polished and etched sections reveal a dense microstructure with evidence of plastic deformation and recrystallization to a fine-grained structure across practically the entire diameter of the sample. The silicon carbide pieces obtained, about 1 mm. in size, are hard, strong, and well-compacted. They easily scratch tungsten carbide.

Example 9.—A 3-inch-long sample consisting of 3 wt. percent of hexagonal boron nitride (d. 2.29 g./cc.) with a particle size range of 3–5 microns and 97% of 30–90 mesh aluminum particles pressed to a density corresponding to 30% theoretical density of boron nitride and 100% theoretical density of aluminum is positioned in an 11-inch-long Type 304 stainless steel sample tube having an outside diameter of 0.5625 inch and an inside diameter of 0.440 inch, between a top section consisting of a solid aluminum cylinder 4 inches long and 0.440 inch in diameter and a bottom section consisting of a shaped aluminum plug 4 inches long. The shape of the bottom plug is as follows: the top is bored out in the shape of a ½-inch-deep inverted cone having a base 0.440 inch in diameter. This cone is filled with pressed sample material. The outside 2 inches at the bottom of the plug has a straight taper from 0.440 inch in diameter to 0.1466 inch diameter at the bottom, thus leaving a conical gap between the stainless steel tube and the shaped bottom aluminum plug. Surrounding and in contact with the stainless steel tube is an annular cylinder of plastic explosive consisting of 35 wt. percent PETN, 15% plastic binder, and 50% red lead, and having a density of 2.6 g./cc., a detonation velocity of 5500 m./sec., and an outer diameter of 2.06 inches. A disk of cap-sensitive, high-velocity sheet explosive 0.25 inch thick x 2.06 inches diameter ($D=7200$ m./sec.) is placed on the top end of the sample assembly in contact with the top surface of the explosive annulus. Detonation of the explosive is initiated by a blasing cap placed at the center of the explosive disk. The peak shock pressure, $P_1$, is about 160 kb. The assembly is recovered intact. The section containing the sample is treated with hot aqua regia to dissolve the aluminum and solids remaining centrifuged, dried and analyzed. The solids contain a substantial amount of the cubic and wurtzitic boron nitride polymorphs, as shown by X-ray diffraction scan. The product readily scratches glass.

The foregoing example demonstrates the feasibility of converting hexagonal (i.e., graphitic) boron nitride to cubic and wurtzitic boron nitride by shocking a mixture of the hexagonal phase and metal cooling medium, according to the process of the instant invention. Although this phase transformation is illustrated using aluminum as the cooling medium, other metals can be employed, as in the case of diamond synthesis.

We claim:

1. Process for subjecting a body of solid material to substantially uniform shock pressures, with smooth and uniform pressure release to ambient pressure, which comprises detonating an explosive or explosively propelling a driver in a manner whereby a pressure pulse is applied progressively in an axial direction to the lateral boundaries of said body which pulse, in the steady state, is of practically uniform magnitude and duration over the lateral boundaries and of practically constant velocity in the body's axial direction; the pressure of said pulse being at least the pressure of a shock wave whose shock velocity equals the axial velocity of said pulse and whose shock pressure, $P_1$, is defined by the formula $$P_1 = \rho_0 D^2 \frac{\Delta D}{V_0}$$

wherein D is the axial velocity of the shock, $\rho_0$ is the initial density of the solid material, $V_0$ is the initial specific volume and $\Delta V$ is the change in specific volume from $V_0$ to that in the compressed state; and the duration of said pulse being sufficient to supply through the motion of the body's lateral boundaries enough mechanical energy per unit length, measured in the axial direction, to sustain a substantially uniform shock wave spanning a major portion of the material between the lateral boundaries.

2. A process of claim 1 wherein the steady state magnitude and duration of the pressure pulse are such that more than 50% of the body's cross-sectional area is subjected to a shock pressure equal to at least 50% of the maximum shock pressure obtainable from a pressure pulse moving at said axial velocity.

3. A process of claim 2 wherein the body of solid material is in a cylindrical metal container; and the pressure pulse is applied by an explosive which surrounds the external curved surface of the container.

4. A process of claim 2 wherein the solid material is a mixture of hexagonal boron nitride and metal cooling medium, and the magnitude and duration of the pressure pulse are sufficient to convert hexagonal boron nitride to cubic and wurtzitic boron nitride.

5. A process of claim 2 wherein the body of solid material is a mixture of non-diamond carbon and metal cooling medium, and the magnitude and duration of the pressure pulse are sufficient to convert said carbon to diamond over a major portion of the body's cross-section.

6. A process for synthesizing diamond from non-diamond carbon, which comprises loading into a hollow cylinder of high impedance metal, a uniform mixture of 3 to 12% non-diamond carbon, by weight, and metal cooling medium, said mixture being compacted so that the non-diamond carbon has a percent relative density of about from 20 to 80% and the cooling medium has a percent relative density of at least about 95% coaxially aligning the container within a hollow driver cylinder of high-impedance metal with a spacing between their facing surfaces of about 0.25 to 10 times the wall thickness of the driver cylinder, the mass of the driver being at least 0.3 times the combined mass of said mixture and container, per unit length; surrounding the outside curved surface of the driver cylinder with a layer of detonating explosive whose mass is about from 1.5 to 10 times that of the driver, the higher ratios being employed with the higher carbon contents, and whose detonation velocity is about from 3000 to 6000 m./sec., the higher velocities being used with the higher density carbon; and initiating said explosive with practically circular symmetry.

7. A process of claim 6 wherein the carbon is graphite and the cooling medium is copper; the percent relative density of the carbon is about from 35 to 65%; the space between the facing surfaces of the driver and container is about 1 to 6 times the driver thickness; and the detonation velocity is about from 4000 to 5000 m./sec.

References Cited

UNITED STATES PATENTS

| | | | |
|---|---|---|---|
| 2,947,617 | 8/1960 | Wentorf et al. | 23—191 X |
| 3,022,544 | 2/1962 | Coursen et al. | 264—84 |
| 3,212,851 | 10/1965 | Bundy et al. | 23—191 |
| 3,238,019 | 3/1966 | DeCarli | 23—209.1 |
| 3,399,254 | 8/1968 | Dunnington | 23—209.1 X |
| 3,401,019 | 9/1968 | Cowan et al. | 23—209.1 |
| 3,499,732 | 3/1970 | Garrett | 23—209.1 |
| 3,220,103 | 11/1965 | Simons | 264—84 X |
| 3,367,766 | 2/1968 | Barrington et al. | 23—191 X |
| 3,364,561 | 1/1968 | Barrington | 29—470.1 |

FOREIGN PATENTS

| | | | |
|---|---|---|---|
| 1,136,677 | 9/1962 | Germany | 264—84 |

EDWARD J. MEROS, Primary Examiner

U.S. Cl. X.R.

23—1, 191, 208; 264—84

UNITED STATES PATENT OFFICE
CERTIFICATE OF CORRECTION

Patent No. 3,667,911  Dated June 6, 1972

Inventor(s) Anthony S. Balchan and George R. Cowan

It is certified that error appears in the above-identified patent and that said Letters Patent are hereby corrected as shown below:

Column 37, line 47, that portion of the formula reading $\frac{\Delta D}{V_o}$ should read $\frac{\Delta V}{V_o}$ Signed and sealed this 9th day of January 1973.

(SEAL)
Attest:

EDWARD M. FLETCHER, JR.
Attesting Officer

ROBERT GOTTSCHALK
Commissioner of Patents